United States Patent [19]

Lefons

[11] Patent Number: 5,398,199

[45] Date of Patent: Mar. 14, 1995

[54] MANY-VALUED LOGIC PROCESSOR FOR DATA QUERY SYSTEMS

[76] Inventor: Ezio Lefons, 13 Via Bitonto, I-70026 Modugno BA, Italy

[21] Appl. No.: 846,806

[22] Filed: Mar. 4, 1992

[30] Foreign Application Priority Data

Mar. 6, 1991 [IT] Italy .............................. RM91A0154

[51] Int. Cl.⁶ ....................... G06F 15/32; G06F 15/40
[52] U.S. Cl. .................................. 364/735; 364/746.2; 364/DIG. 2; 395/600
[58] Field of Search ............... 395/600, 375, 775, 425, 395/800; 364/735, 746.2

[56] References Cited

U.S. PATENT DOCUMENTS

| | | | |
|---|---|---|---|
| 3,827,030 | 7/1974 | Seipp | 395/375 |
| 4,286,330 | 8/1981 | Isaacson | 395/375 |
| 4,357,678 | 11/1982 | Davis | 395/775 |
| 5,274,788 | 12/1993 | Koike | 395/425 |

OTHER PUBLICATIONS

"Dedicated Machines Take on Data-Base Management" 2328 Electronic Design, vol. 30, No. 12, Jun.
"Extending the Database Relational Model to Capture More Meaning" ACM Transactions, vol. 4, No. 4, Dec. 1979.
Sigmod Record, vol. 19, No. 1, Mar. 1990, pp. 29-35 "Four Valued Logic for Relational Database Systems".

Primary Examiner—Paul V. Kulik
Attorney, Agent, or Firm—Pollock, Vande Sande & Priddy

[57] ABSTRACT

This data query apparatus consists of an application software and a circuitry for the processing of the data selection condition of the user query embodied in a host data base management system or information retrieval system. The application software translates the selection condition into the standard form which the circuitry can process. From the host system, and for each data record to be analyzed, the circuit apparatus receives the logical values taken on by the atomic conditions of the query and returns the logical value that the global selection condition takes on. This system allows the user to query the data on the basis of any truth-valued logic set up an arbitrary number of logical values, within the limits fixed by the system developer.

3 Claims, 16 Drawing Sheets

|     | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
|  | 0 | 1 | 0 | 1 | 0 | 1 | 0 | 1 | 0 | 1 | 0 | 1 | 0 | 1 | 0 | 1 |
|  | 0 | 0 | 1 | 1 | 0 | 0 | 1 | 1 | 0 | 0 | 1 | 1 | 0 | 0 | 1 | 1 |
|  | 0 | 0 | 0 | 0 | 1 | 1 | 1 | 1 | 0 | 0 | 0 | 0 | 1 | 1 | 1 | 1 |
|  | 0 | 0 | 0 | 0 | 0 | 0 | 0 | 0 | 1 | 1 | 1 | 1 | 1 | 1 | 1 | 1 |

CODE

402
| AFF | NEG | IND |
|---|---|---|
| 2 | 3 | 1-0 |

CIRCUIT AX

403
| AFF | NEG | IND |
|---|---|---|
| 3 | 2 | 0-1 |

CIRCUIT AE

404
| AFF | NEG | IND |
|---|---|---|
| 1 | 0 | 3-2 |

CIRCUIT OE

405
| AFF | NEG | IND |
|---|---|---|
| 0 | 1 | 2-3 |

CIRCUIT OX

CODE

502
| AFF | NEG | IND |
|---|---|---|
| 2 | 5 | 1-0 |
| 4 | 3 | 1-0 |

CIRCUIT AX,AE

503
| AFF | NEG | IND |
|---|---|---|
| 5 | 2 | 7-6 |
| 3 | 4 | 7-6 |

CIRCUIT OE,OX

| NAME  | SEX | CIVIL STATUS | YEAR OF MARRIAGE |
|-------|-----|--------------|------------------|
| SMITH | m   | MARRIED      | 1950             |
| JONES | m   | SINGLE       | ?                |
| BLAKE | f   | MARRIED      | ?                |
| CLARK | f   | ?            | ?                |
| ADAMS | m   | MARRIED      | 1937             |

| NAME  | SEX | CIVIL STATUS | YEAR OF MARRIAGE |
|-------|-----|--------------|------------------|
| SMITH | m   | MARRIED      | 1950             |

2020

2021

| NAME  | SEX | CIVIL STATUS | YEAR OF MARRIAGE |
|-------|-----|--------------|------------------|
| SMITH | m   | MARRIED      | 1950             |

2022

| NAME  | SEX | CIVIL STATUS | YEAR OF MARRIAGE |
|-------|-----|--------------|------------------|
| BLAKE | f   | MARRIED      | ?                |
| CLARK | f   | ?            | ?                |

2030

2031

| NAME  | SEX | CIVIL STATUS | YEAR OF MARRIAGE |
|-------|-----|--------------|------------------|
| SMITH | m   | MARRIED      | 1950             |

2032

| NAME  | SEX | CIVIL STATUS | YEAR OF MARRIAGE |
|-------|-----|--------------|------------------|
| BLAKE | f   | MARRIED      | ?                |

2033

| NAME  | SEX | CIVIL STATUS | YEAR OF MARRIAGE |
|-------|-----|--------------|------------------|
| CLARK | f   | ?            | ?                |

FIG. 20

MANY-VALUED LOGIC PROCESSOR FOR DATA QUERY SYSTEMS

FIELD OF THE INVENTION

This invention can be applied to file management and data base management systems and, in particular, to digital apparatus and its associated software for the processing of data query transactions.

BACKGROUND OF THE INVENTION

Information Retrieval/Data Bank systems (IR systems) and Data Base Systems (DB systems) are basic applications of digital computers. Whereas the IR systems are generally available only on mainframes via networks, the DB systems are available on the majority of computers, from mainframes to personal computers, and consist of software packages and sometimes specialized hardware apparatus. The query process involves a selection of stored records. The user can request the execution of final operations on the selected records (their printing or display on the screen of the personal computer) or, for DB users, also intermediate operations (their manipulation and storage). The records are selected on the basis of the query condition expressed by the user on the data by means of a query language. The language provided by the system developer, however, is not always semantically adequate to support all the user needs.

The aim of the system developer is to implement methods for the fastest possible selection of records from those available. The selection execution time depends on data structures utilized, performance of CPU and input/output devices, data transmission speed between main memory and mass storage, and, finally, query complexity. In fact, the more the number of atomic conditions expressed by the user, the longer the mean CPU time needed to evaluate them on the data. On the other hand, there may be inherent difficulties directly concerning the decision as to whether particular records do or do not satisfy the query condition.

As an example, a common use of IR systems, namely, bibliographical reference systems, is first considered. In this context, the user query concerns the retrieval of bibliographical references on a specified subject and it is formulated as a logical expression of keywords-each one signifying a search topic. A problem arises in the presence of keywords which are generic or not included in the thesaurus on which the bibliographical source classification is based. The current query processing method consists of assigning every bibliographic source with a "probability of relevance" to the specified topics, then evaluating the probability of relevance of the source to the global query and, finally, furnishing the bibliographic sources in decreasing order of probability (exceeding a given threshold).

As regards DB systems, the main difficulty is due to the possible presence of null values. The American National Standard Institute report (ref. [1] of bibliography) lists 14 kinds of null values, that is, 14 cases when a data value is considered null. For example, the value is null whenever it is inapplicable to some entities (the maiden name of male employees), applicable but presently non-existent (the profession of a child), inconsistent, or unknown (because it is protected, unavailable, missing, being updated or validated, etc). Lastly, the value is null when it depends on values which are null themselves. The decision process is also problematic when the data value is a placeholder for one in a given set of (real and/or null) values. This "special value" case differs from the "null value" in that the actual value is neither null nor protected and, in any case, it is not suitable to specify it with precision. Details can be found in Lefons' paper (ref. [5] of bibliography).

The usual query processing consists typically of the following schematic steps. Step I: query compilation and translation into object code. In particular, the query condition is decomposed into atomic conditions directly applicable to the data. The object code contains the instructions to evaluate the atomic conditions and to appropriately assemble the partial results. Step II: serial or indexed read-in of a data record from peripheral memory. Step III: evaluation of the atomic conditions on the data. For each atomic condition, this evaluation process assigns the truth value true or false as result according to whether the data record does or does not satisfy that atomic condition. Step IV: assembly of the results obtained in step III by means of Boolean operations and, or, and not. On the basis of the result (true or false) of this composition, the record is selected or rejected. Steps II, III, and IV are repeated for all records available. Step V: execution of the intermediate/final operations on the selected records.

There are two main inconveniences which compromise the flexibility and functionality of the system. One is the fact that the time required to process the selection condition depends directly on its complexity. The second is derived from the presence, often unavoidable, of null, special, or probability values as possible data values and, consequently, as results of the atomic condition evaluation. In fact, using the ordinary two-valued logic {true, false}, conditions applied to null, special, or probability values cannot be assigned a proper truth value. The problem of deciding if and how to support many-valued logics is, at present, a difficult task for the system developer. In state-of-the-art systems, the trend is to adopt fuzzy logics for the IR systems. As for Data Base Management Systems (DBMSs), the proposed solutions generally disagree on both the number and meaning of truthvalues to be considered and the logic semantics (truth tables for and, or, and not). In his paper (ref. [2] of bibliography), E. F. Codd suggests the use of the standard ternary logic to support the null value meaning "property unknown" and the application of the so-called null substitution principle to evaluate the three-valued logical expressions. One problem with the null substitution principle is that it is computationally hard to apply (its complexity is exponential in the number of nulls which occur in the logical expression to be evaluated).

SUMMARY OF THE INVENTION

The query system for data base/bank of the subject invention overcomes the problems described above with respect to existing solutions and proposals and is technically more advanced in that it performs the composition of results of the atomic condition evaluation in a standard way which is independent of the query complexity. Moreover, this system can be built to support any finite number of truth values. In fact, it sets no limits to number and meaning of manageable logical values and permits a query language to be defined and a query processing tool to be implemented which both respond better to the user's semantic needs.

This query system consists of an application software which transforms the selection condition and a circuit which processes the logical values taken on by the atomic conditions.

In reference to the query processing steps illustrated above, the application software runs at Step I. Its task is to properly encode the query condition on the basis of the number of truth values, their binary codes, the logic semantics and type of circuit apparatus utilized. Steps II and III perform the functions previously described. The circuit apparatus replaces the software process at Step IV. Its input is the encoded query condition produced in Step I and the partial results produced in Step III. The output is (the code of) the truth value that the global condition takes on and it is the same as that obtainable by applying the truth tables of the logic. On the basis of the result, the system decides whether that record must be discarded, accepted, or included in some class of relevance to the query. The main advantages of processing the query condition with this circuit over the conventional process at Step IV are that it is independent of the logic adopted and its extremely fast response-time (linear in $(1+\log_2 n)$, where n is the number of truth values of the logic).

Moreover, this query apparatus has two important flexibility characteristics. (1) The circuitry can be used for any logic whose number of truth values is less than or equal to the maximum fixed by the system developer. In this case, the time required to produce the output is the same as for an apparatus especially built for logics of that truth value number. (2) The present debate about the semantics to be assigned to a many-valued logic is avoided. In fact, various alternative logic semantics can be supported and can be selected for the query processing; the application software adjusts the selection condition to the logic selected by the user or, in lack of a user specification, to the logic designated by the system developer as the default logic. This flexibility can be further increased by allowing the user to directly formulate his own semantic criterion of query processing when expressing the selection condition. Although this requires an adaptation of the query language for this capability, a language semantically richer than those commercially available can be offered to users, as advocated by G. H. Gessert and E. F. Codd (cf., refs. [4] and [3] of bibliography, resp.)

BRIEF DESCRIPTION OF THE DRAWINGS

FIGS. 3 through 7 show typical tables utilized by the application software;

FIG. 19 illustrates a sample database; and

FIG. 20 illustrates a typical printer output relative to a query against the database of FIG. 19.

DETAILED DESCRIPTION

Figure 1:
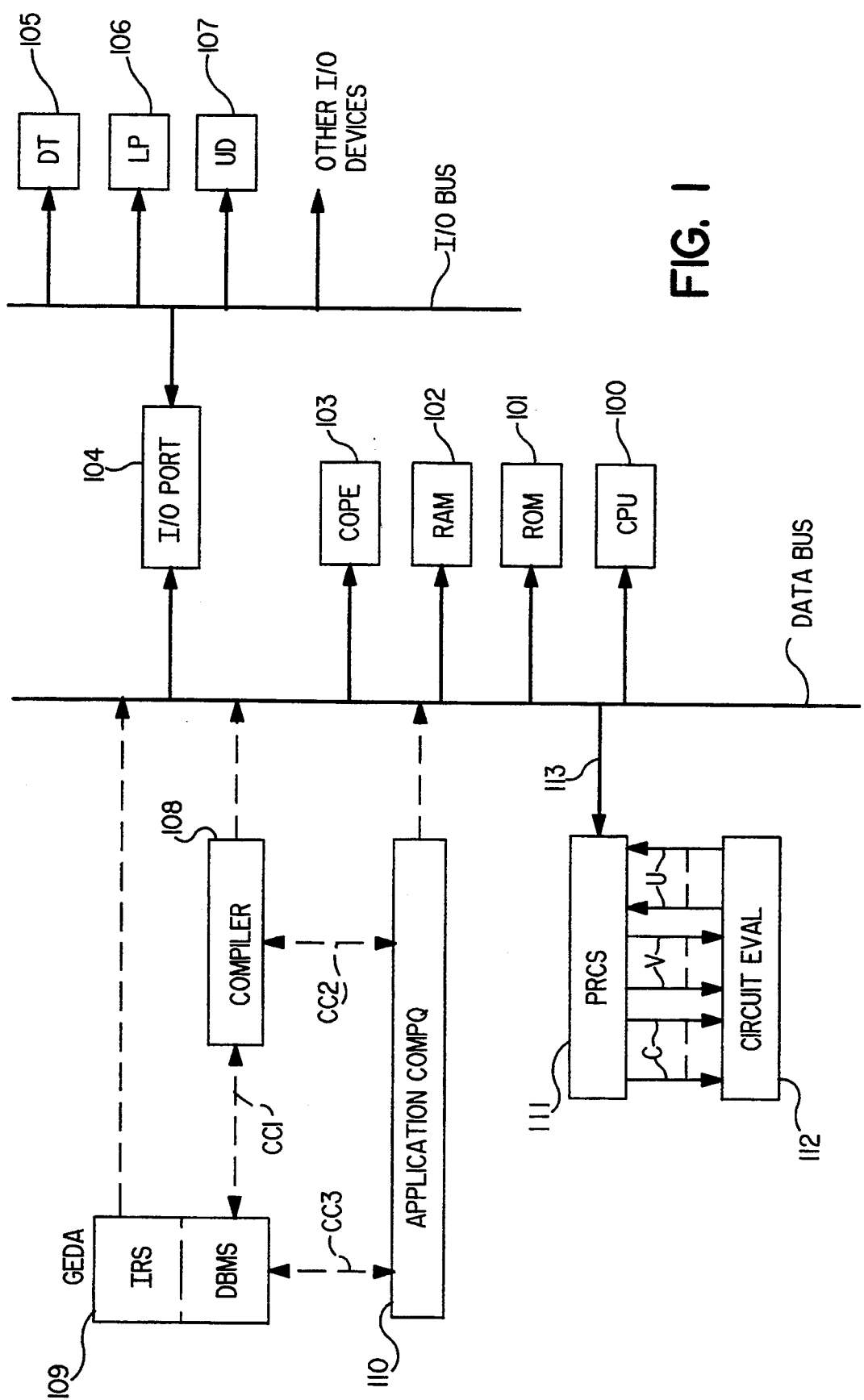
FIG. 1 illustrates the subject data query system embodied in a digital computer in block diagram form.

The data query system is illustrated in FIG. 1. The system consists of a conventional file management system which comprises the apparatus of this invention. (To provide an illustrative example, FIG. 1 refers to a personal computer architecture). The host system typically consists of a CPU 100 connected via DATA BUS to the main memory (ROM 101, RAM 102), an eventual numeric coprocessor (COPE 103), and an I/O port device 104 to interface, via I/O BUS, various peripheral devices such as digital terminal DT 105, printer LP 106, large disk storage units UD 107, and other eventual peripheral I/O devices or drives for permanent storage. As to the software component, the host system is equipped with usual system software and, in particular, with a compiler 108 which translates the query into object code. Depending on the application of this query system, the file management system (GEDA 109) consists of an information retrieval system (IRS) or database management system (DBMS). Compiler 108 and system GEDA 109 exchange data via data bus, or directly via interprocess communication path CC1 in the case where the compiler 108 is embedded in GEDA 109. The apparatus of this invention consists of application software COMPQ 110 and processor module PRCS 111 which governs circuit EVAL 112. Processor PRCS 111 conveys input data to circuit EVAL 112 via leads C and V and receives its output via leads U. Host system and processor PRCS 111 communicate between them via data bus 113.

Application COMPQ 110

The user query, entered via terminal DT 105 for example, is processed by system GEDA 109. By means of the data dictionary (not shown), GEDA 109 determines the files (stored on secondary memory UD 107) involved in the query and, interacting closely with compiler 108, generates the corresponding object code. The code is stored in memory RAM 102 to be subsequently read and executed by CPU 100.

Figure 2:
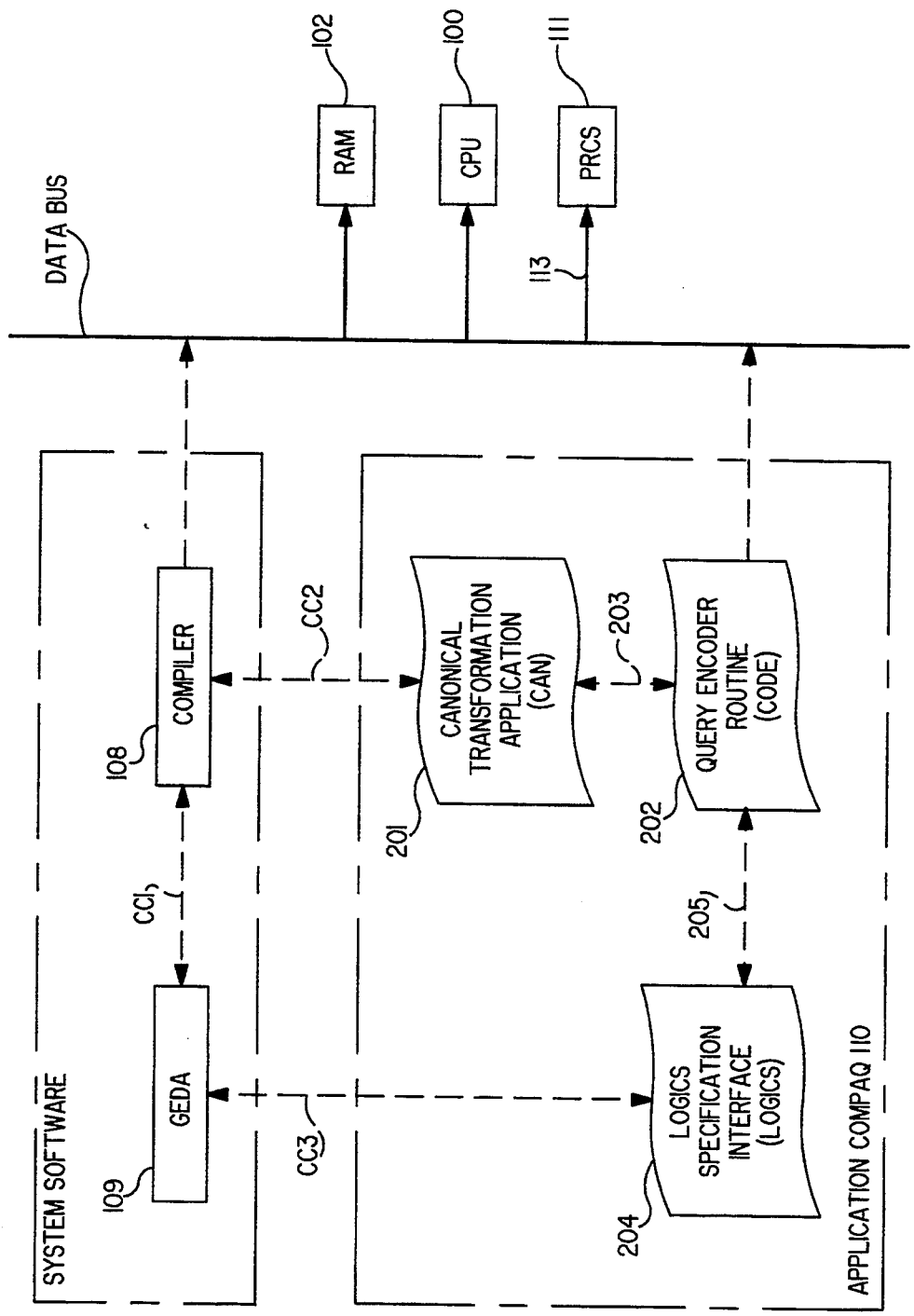
FIG. 2 illustrates the application software in block diagram form.

Application COMPQ 110, illustrated in FIG. 2 in block diagram form, adapts the query selection condition to the distinctive features of the logic selected among those supported by the system (discussed below), and contains two basic components: canonical transformation application CAN 201 which transforms the selection condition, and encoder routine CODE 202 which encodes the transformed selection condition in binary string form. Routine CODE 202 interfaces file management system GEDA 109 via module LOGICS 204.

Canonical Forms of the Query Condition

Application CAN 201 receives the logical expression representing the query selection condition from compiler 108 via interprocess communication path CC2 and transforms it to minimal canonical form.

A detailed explanation of the canonical forms of a logical expression is beyond the scope of this presentation. Here it suffices to say that every logical expression can be put into an equivalent canonical form, that is, transformed in a set of clauses. A clause is a logical form of atomic conditions; it is a "conjunct" if it is an and-product of atomic conditions, or it is a "disjunct" if it is an or-sum of atomic conditions. The canonical form is said to be "disjunctive" or "conjunctive" depending on whether it is an or-sum of conjuncts or an and-product of disjuncts respectively. Each clause involves all distinct atomic conditions of the query and there is an ordering among the atomic conditions. Each clause differs from the others in the form of one or more atomic conditions. Here we limit our presentation to the three following forms of atomic condition within a clause: (1) affirmative, (2) negative, or (3) indifferent, according to whether the atomic condition appears in the clause, respectively, as (1) positive literal (not applied with logical not), (2) negative literal (applied with logical not), or (3) don't care literal (corresponding to don't care in Boolean algebras). In virtue of the order assigned to the atomic conditions, the clauses do not contain the real atomic conditions but only the proper codes of their form.

Since the truth-valued results of the atomic condition evaluation on a data record are assembled by circuit EVAL 112, application CAN 201 transmits to compiler 108 via interprocess communication path CC2 the sequence of atomic conditions in their affirmative form, regardless of whether one or more are negative conditions (applied with logical not in the user query). Therefore, the object code produced by compiler 108 always concerns the evaluation of atomic conditions in the affirmative form, according to the order assigned from application CAN 201.

On completion of the transformation of the query condition to a minimal canonical form (that is, with a minimal number of clauses) and when the number of clauses is greater than 1, application CAN 201 generates a clause which we term "final" to distinguish it from the previously described ones. Since circuit EVAL 112 evaluates the truth value of an entire clause at once on the basis of the truth values taken on by the (affirmative) atomic conditions, the purpose of the final clause is to permit the entire canonical form and hence the query condition to be evaluated again by means of EVAL 112. This is achieved by considering clauses as virtual atomic conditions and, consequently, the truth-valued results of clause evaluation as the results of evaluation of such virtual atomic conditions. Therefore, the final clause consists of as many virtual atomic conditions (of the affirmative form and encoded as such) as the clauses and it is a disjunct or a conjunct depending on whether the canonical form is disjunctive or conjunctive respectively.

As a final function, application CAN 201 passes the canonical form and eventual final clause to encoder routine CODE 202 via interprocess communication path 203. To encode the canonical form and final clause according to the logic semantics selected, routine CODE 202 reads information associated with that logic from module LOGICS 204 via interprocess communication path 205.

Logics Specification Interface

Module LOGICS 204 contains a code table and one or more correspondence tables.

The code table is unique for all logics supported by the query system and its columns contain the binary code of integers 0, 1, 2, etc. For any logic of, say, n truth values, the first n rows of the code table are utilized. FIG. 3 illustrates the code table for up-to-4 valued logics. Sub-table 301 refers to two-valued logics, sub-table 302 to three-valued logics while table 303 refers to four-valued logics.

The correspondence tables can be more than one and the values of a table depend on (a) the logic associated with that table, namely the truth tables for and, or, and not; (b) type of circuit EVAL 112 utilized; and (c) binary code used to represent the truth values. As will be seen later, circuit EVAL 112 can be of type AX (composed of AND/XOR gates), AE (composed of AND/EQUIVALENCE gates, i.e. AND/XNOR gates), OE (composed of OR/EQUIVALENCE gates), or OX (composed of OR/XOR gates). For the n-valued logics currently reported in the literature, any n, the number of bits of truth value code is $n-1$, that is, it equals the number minus one of truth values of that logic. On the contrary, special logics not considered in the literature require an n-bit code. (The use of fewer bits than that specified above generally produces a longer circuit response-time and lowers the use flexibility of the query system. The circuit apparatus relative to less than $n-1$ bit code will not be illustrated).

The correspondence table of any given logic has three columns and as many rows as the number of bits of truth value code for that logic. The columns refer respectively to the three forms of atomic condition in a clause, namely, the (1) affirmative, (2) negative, and (3) indifferent forms. A column contains either one or two values for each row: when two values are present, the first value applies to clauses which are conjuncts while the second to clauses which are disjuncts; when only one value is present, it applies to both types of clauses.

FIG. 4 shows the tables associated with the ordinary two-valued logic {T,F}. (For this logic, the final clause is not generated). The truth values are assigned the usual 1-bit code shown in table 401, that is, 1 for T, and 0 for F. Tables 402, 403, 404, and 405 are the respective correspondence tables related to circuit EVAL 112 of type AX, AE, OE, and OX.

FIG. 5 shows the tables associated with the standard three-valued logic {T,U,F}. The 2-bit code assigned to the truth values is shown in table 501, that is, 11 for T, 01 for U, and 00 for F. Correspondence table 502 refers to circuit EVAL 112 of type AX/AE, while table 503 refers to type OE/OX.

Figures 6, 7:
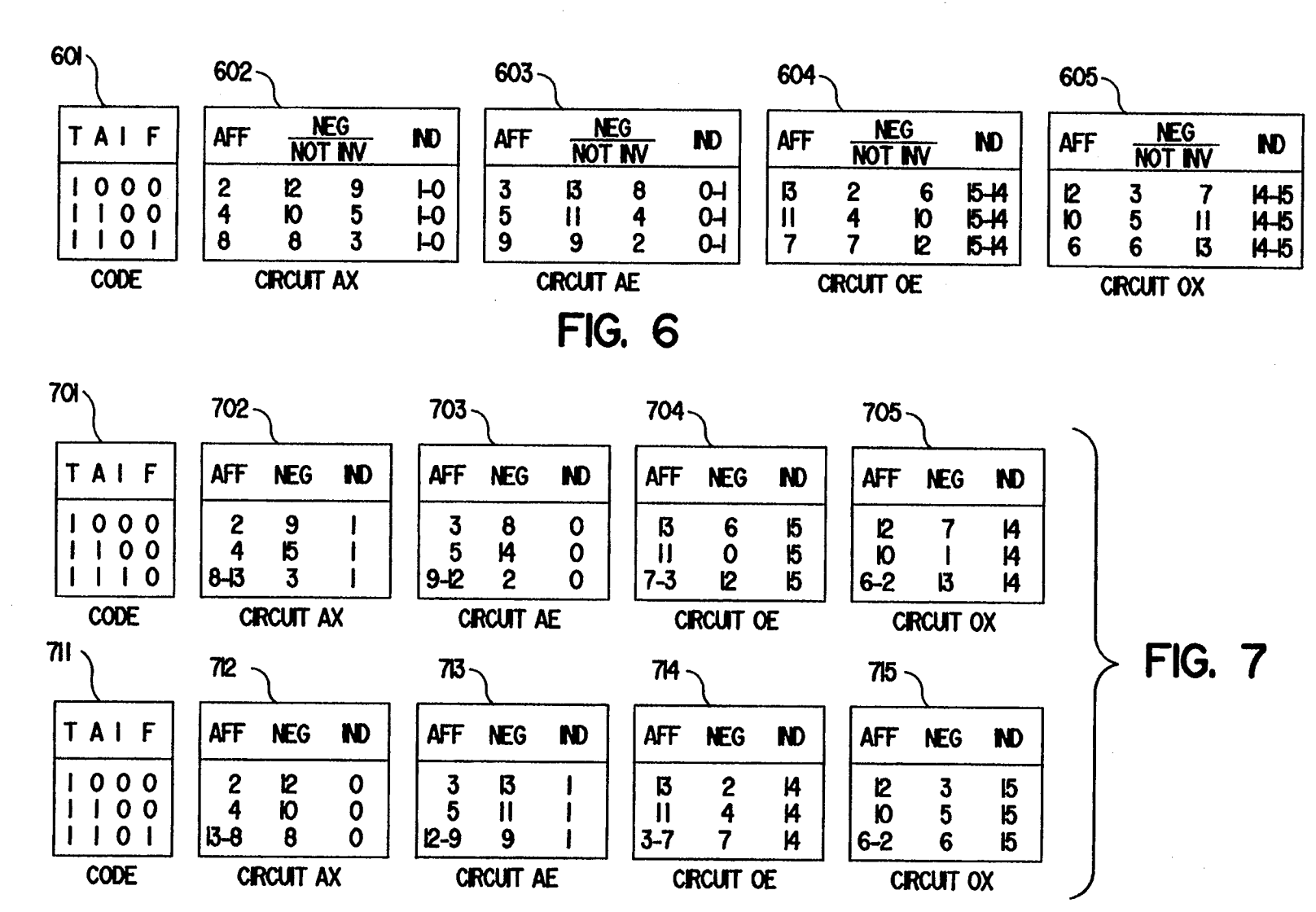

FIG. 6 shows the tables associated with the standard four-valued logic {T,A,I,F}. (The truth values A and I correspond to the null values which mean "missing and Applicable" and "missing since Inapplicable" respectively). The 3-bit code assigned to the truth values is shown in table 601, that is, 111 for T, 011 for A, 000 for I, and 001 for F. Correspondence tables 602, 603, 604, and 605 refer to circuit EVAL 112 of type AX, AE, OE, and OX respectively. This logic has two negation operators (i.e., two truth tables for not), termed NOT and INV, as described by Gessert (ref. [4] of bibliography). The NOT and INV columns of the correspondence tables refer respectively to these two possible negative forms of the atomic condition.

FIG. 7 shows the tables associated with Codd's four-valued logic {T,A,I,F}. The truth values of this logic have the same meanings as those of the standard four-valued logic but different truth tables. E. F. Codd strongly suggests this four-valued logic to be an integral part of the future relational DBMS products (ref. [3] of bibliography). As to the 3-bit code assigned to the truth values, table 701 illustrates the code utilized when the canonical form produced by application CAN 201 is disjunctive or consists of a single conjunct, while table 711 illustrates that utilized when the canonical form is conjunctive or consists of a single disjunct. Correspondence tables 702, 703, 704, and 705 are associated with the truth value code shown in table 701, while correspondence tables 712, 713, 714, and 715 are associated with that shown in table 711, and are related to circuit EVAL 112 of type AX, AE, OE, and OX respectively.

In general, the truth values of a logic may be assigned various binary codes. Therefore, the tables shown in FIGS. 4, 5, 6, and 7 refer only to one possible code.

The values of a correspondence table refer to the column headings of the code table. The code table is referenced by all correspondence tables, as also those associated with different logics than those referred to in FIGS. 4 through 7. Furthermore, it can be utilized to process any query based on the user's personal logic semantics, provided that the query language furnished to the user can support this semantical capability, as already mentioned. (This aspect, as well as the criterion for deriving truth value codes and correspondence tables on the basis of the logic semantics, and the bases of the code table will not be discussed in detail because beyond the scope of this presentation). If the query system supports various logics, then the user can specify which has to be applied in the query condition evaluating process. When not specified, the system default logic is selected. Information concerning the selected logic is transmitted from system GEDA 109 to module LOGICS 204 via interprocess communication path CC3. This results in selecting the proper correspondence table and code sub-table. Routine CODE 202 accesses module LOGICS 204, and hence the selected tables via interprocess communication path 205.

C Strings

Routine CODE 202 encodes the clauses of the canonical form and the final clause as follows. For each clause, as many bit-arrays as rows of the correspondence table are constructed. The first array is obtained by replacing each atomic condition in that clause with the column of the code table headed by the value (contained in the first row of the correspondence table) that corresponds to the form of that atomic condition; the second array is obtained by properly replacing the atomic conditions with the columns of the code table headed by values contained in the second row of the correspondence table, and so on. More precisely, since a clause is either conjunct or disjunct, only three columns of the correspondence table are involved for each clause and for each atomic condition. So, we assume that every row of the correspondence table has only three values which identify three column headings of the code table, and the first, second, or third header value is used according to whether the encoding atomic condition in the clause appears as affirmative, negative, or indifferent, respectively. Therefore, each array consists of as many rows (C strings, denoted by $C0, C1, \ldots, Cn-1$) as the rows of the code sub-table concerned (that is, the number of truth values of the selected logic), and the number of bits of every C string equals the number of distinct atomic conditions expressed in the query.

Once all clauses of the canonical form and final clause are encoded in C string arrays, application COMPQ 110 ends its task, and the host system transmits the following data to processor PRCS 111 via data bus 113: identifier of the selected logic (1 byte). This data is unnecessary whenever the query system supports only one logic; type of the canonical form, namely, disjunctive or conjunctive (1 bit); number of clauses (1 byte); number of atomic conditions (1 byte); C string arrays.

As soon as the transmission has been completed, the host system can definitively start the data record processing in order to execute the user query.

V Strings

For each data record to be processed, the host system evaluates and transmits to processor PRCS 111 in the V string form described below, the sequence of truth values taken on by atomic conditions, according to the order assigned to them.

This truth value sequence and the subsequent one resulting from the processing of all clauses of the canonical form are encoded on the basis of the truth value code in the so-called V strings (denoted by $V1, V2, \ldots, Vn-1$ when referring to common logics, or $V0, V1, \ldots, Vn-1$ when referring to the special n-valued logics assigned an n-bit code, respectively). $V1$ (resp., $V0$) is the ordered sequence of the first bits of the truth value code sequence, $V2$ (resp., $V1$) is the ordered sequence of the second bits of the truth value code sequence, and so on, up to the $Vn-1$ string, which is the ordered sequence of the last bits of the truth value code sequence. The V strings relative to the truth values taken on by the atomic conditions are constructed by host system, and the bit length of these V strings equals that of the C strings relative to the clauses of the canonical form. On the contrary, the V strings relative to the truth values resulting from the processing of clauses are constructed by processor PRCS 111, and their length equals that of the C strings relative to the final clause.

Processor PRCS 111

Figure 8:
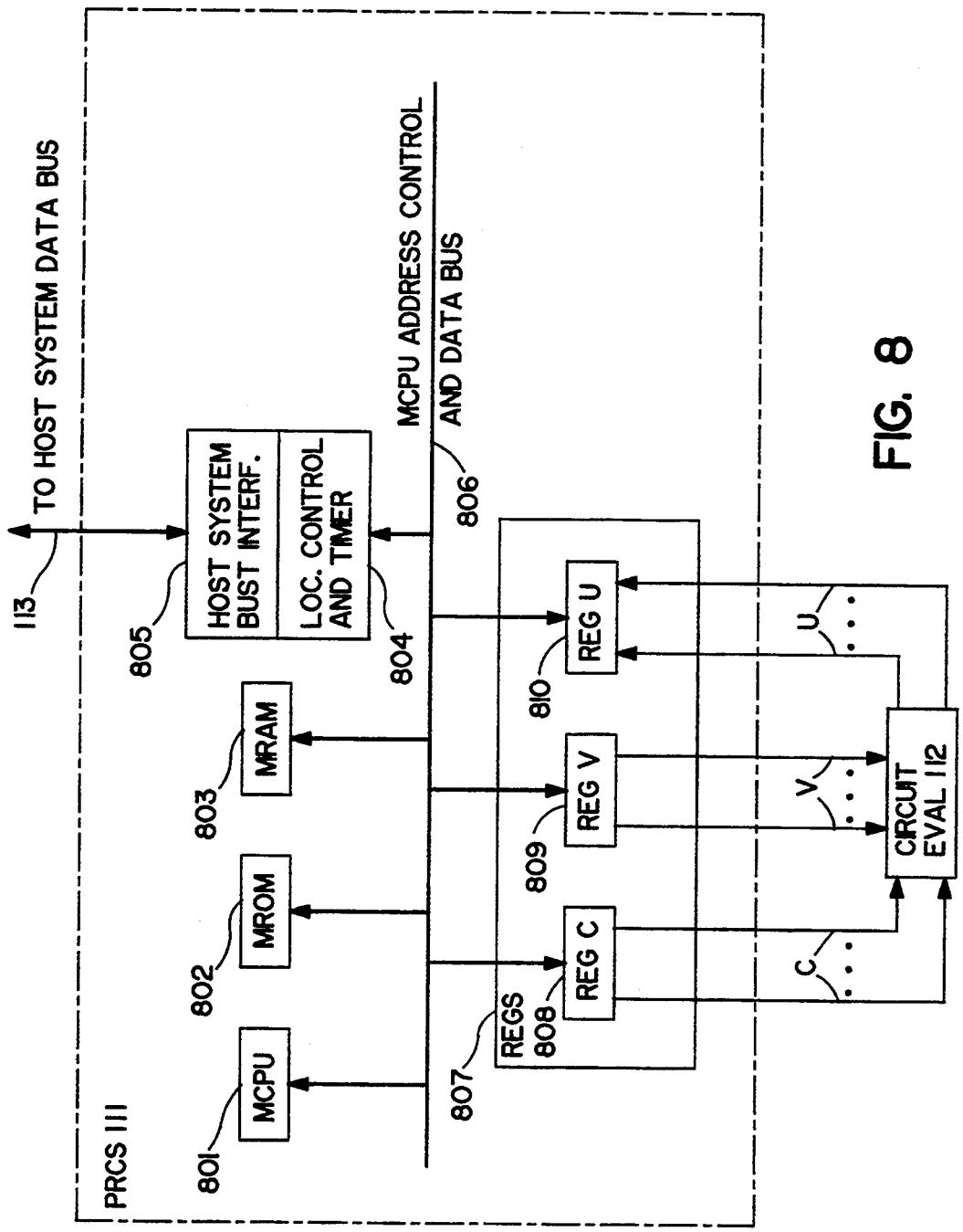
FIG. 8 illustrates a detailed schematic diagram of the circuit apparatus.

The circuit apparatus card, illustrated in FIG. 8 in block diagram form, is plugged into one of the expansion slots of host computer. The operation of the circuit apparatus card is controlled by a microprocessor shown in FIG. 8 as MCPU 801. MCPU 801 can be any state-of-the-art microprocessor, for example a 32 bit microprocessor. However, in order to reduce the query process time, the register length must not be less than the maximum number of distinct atomic conditions that system GEDA 109 permits in the query.

The main functions of MCPU 801 are: (1) to communicate and manage the relative protocol with the host system via data bus 113, (2) to write and read registers REGS 807 via data bus 806, and (3) to time the operation of circuit EVAL 112.

Read only memory (MROM 802) is the memory device on processor card 111 which contains the instruction set for the operation of MCPU 801. Random access memory (MRAM 803) consists of the read/write memory which is used by MCPU 801 as read/write memory space for transferring information to and from the host computer. The communications protocol between host system and processor 111, whose actual description is unimportant in this presentation, is handled by means of local control and timer 804 and buffered interface 805 devices, while the physical and link layer protocols are handled by the devices which comprise processor card 111. REGS 807 are parallel registers subdivided in registers REG C 808, REG V 809, and REG U 810. The C registers 808 and V registers 809 convey data input to, and the U registers 810 data output from the combinational circuit EVAL 112 over the respective C, V, and U leads. Circuit EVAL 112 provides the evaluation of truth values that the clauses and then the final clause take on.

For each data record on completion of its task, processor PRCS 111 transmits the truth value code taken on by the final clause to host system. In parallel to the process performed by processor PRCS 111 on current record, CPU 100 evaluates and constructs the V strings relative to the subsequent data record. The overlapping of these two basic and repetitive processes allows the wait times, hence the global query response-time, to be minimized.

b-circuits of EVAL 112

Circuit EVAL 112 consists of a certain number of so-called b-circuits which are used in parallel or timed by MCPU 801.

A b-circuit can be of types AX, AE, OE, and OX, and to assure the highest use flexibility of the query system, all b-circuits must be of the same type. So, we shall assume that the b-circuits of circuit EVAL 112 are all duplicates of a given b-circuit, except leads for input-/output data transmission.

For any given clause, a b-circuit processes the (V strings and) C strings of an array (for example the one constructed on the basis of the first row of the correspondence table) and produces an equally lengthed U string as output to be used by MCPU 801 to determine the first code bit of the truth value that the clause takes on. Similarly, the b-circuit which processes the (V strings and) C strings of the array derived from the second row of the correspondence table produces the U string to be used by MCPU 801 to determine the second bit of the truth value code, and so on.

Consequently, the parallel utilization of b-circuits in a number equal to that of bits of truth value code allows a clause to be processed as fast as possible. Moreover, the availability of more b-circuits than those above can enable the query system to process more than one clause parallely.

Registers REGS 807

The C and V registers are set respectively to the C and V strings by MCPU 801, and they are applied to the input of circuit EVAL 112 through leads shown in FIG. 8 respectively as C and V leads. The U registers are set by circuit EVAL 112 to signals (U strings) generated on leads shown as U leads. Each lead refers to a register.

Registers C 808 are grouped by the b-circuit to which they convey data, and they are set by MCPU 801 for each clause to be processed. On the contrary, registers V 809 are shared by all b-circuits and their content is persistent during processing of all clauses on the current data record, except for the processing of the final clause where they are set by MCPU 801 to the V strings constructed on the basis of U strings as produced in appropriate registers U 810 by the b-circuits.

The register length is not less than the established maximum number of distinct atomic conditions that can occur in the user query. Since the actual number of atomic conditions expressed in a query is generally less than the maximum, some bits of the C, V, and U registers can be superfluous, for example the right-most ones. On the other hand, MCPU 801 determines the truth value of a clause on the basis of the entire content of appropriate U registers. In order to minimize the time necessary to analyze the U registers, MCPU 801 sets the superfluous bits of the C and V registers so that a given pattern is set to the superfluous bits of the U registers, for example a pattern of all 1's or all 0's. In order that the superfluous bits of the U registers be set to the pattern of all 1's (resp., all 0's), MCPU 801 is programmed to set to 1's (resp., to 0's) the superfluous bits of the C and V registers assigned to the C0 strings and the eventual V0 string. (The V0 string, we must recall, refers to special logics whose n truth values are assigned an ncode). As to the superfluous bits of all the other C and V registers, if the b-circuit is of type AX/OX (resp., AE/OE), then they are set to all 0's (resp., to all 1's). We assume that MCPU 801 operates so that the superfluous bits of the U registers are set to 1's (resp., to 0's) whenever the processed clause is a conjunct (resp., a disjunct).

Number of Registers REGS 807

The number of the C, V, and U registers depends on both the maximum number of truth values supported by the query system and the number of bits of truth value code. The n-valued logics assigned an (n−1)-bit code (such as those referred to in FIGS. 4 through 7) are first considered.

Figure 9:
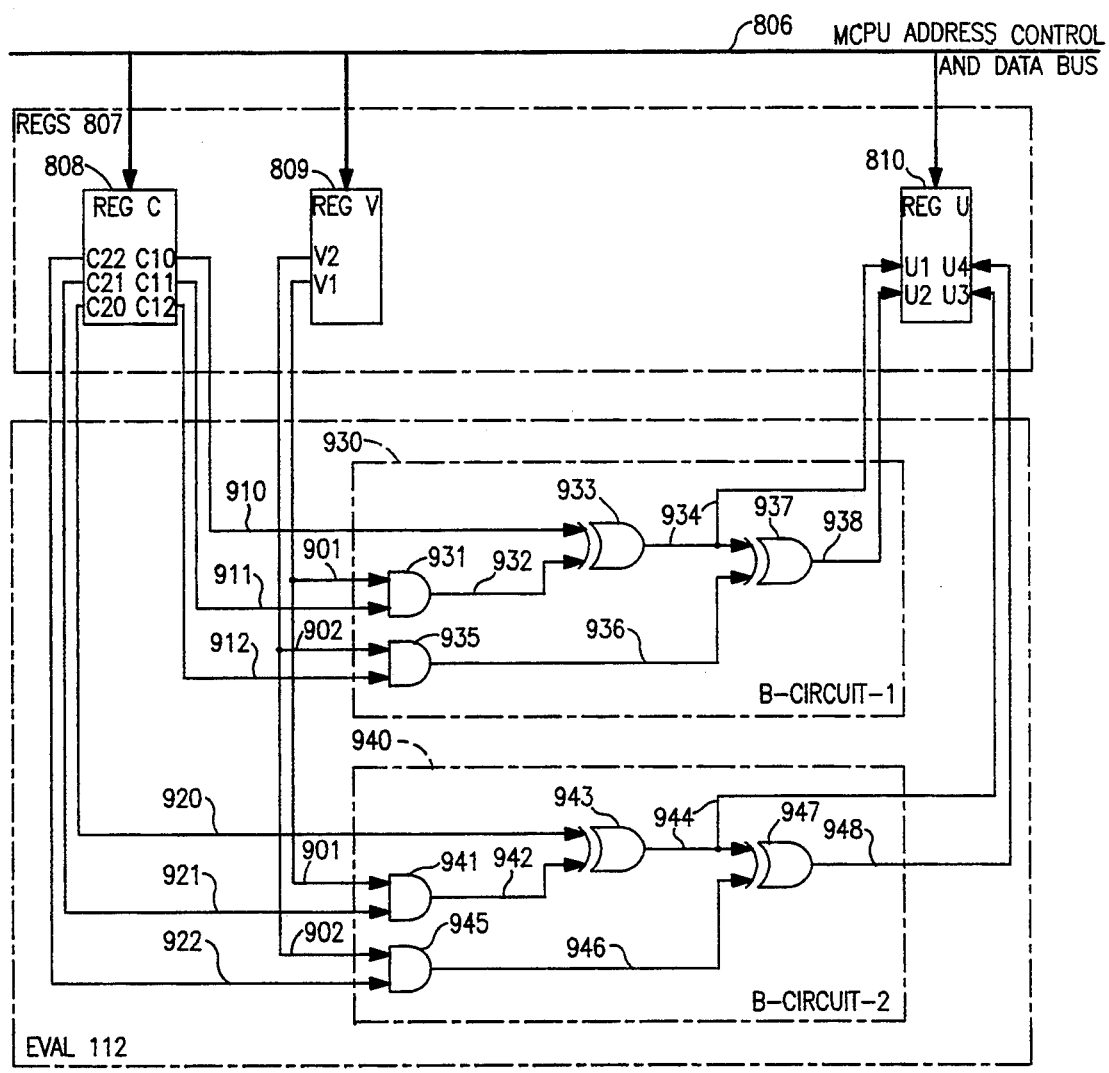
FIG. 9 depicts the details of one type of circuit for up-to-3 valued logics.

FIG. 9 illustrates the typical circuit EVAL 112 of type AX for up-to-3 valued logics. Since the truth values of a 3-valued logic have a 2-bit code, circuit EVAL 112 consists of two b-circuits, namely b-circuit-1 930 and b-circuit-2 940. These b-circuits share the two V1, V2 registers of REG V 809. Since every clause is encoded by two arrays, each one consisting of three C strings (the C0,C1,C2 strings), b-circuit-1 930 is connected to the three registers of REG C 808, shown as C10,C11,C12, which are set to the C strings of one array, for example that derived from the first row of the correspondence table, while b-circuit-2 940 is connected to the three C registers, shown as C20,C21,C22, which are set to the C strings of the other array, that derived from the second row of the correspondence table. The U registers of REG U 810 are (at least) two for each b-circuit: the U1,U2 registers are connected to b-circuit-1 930, and the U3,U4 ones to b-circuit-2 940.

Figure 10:
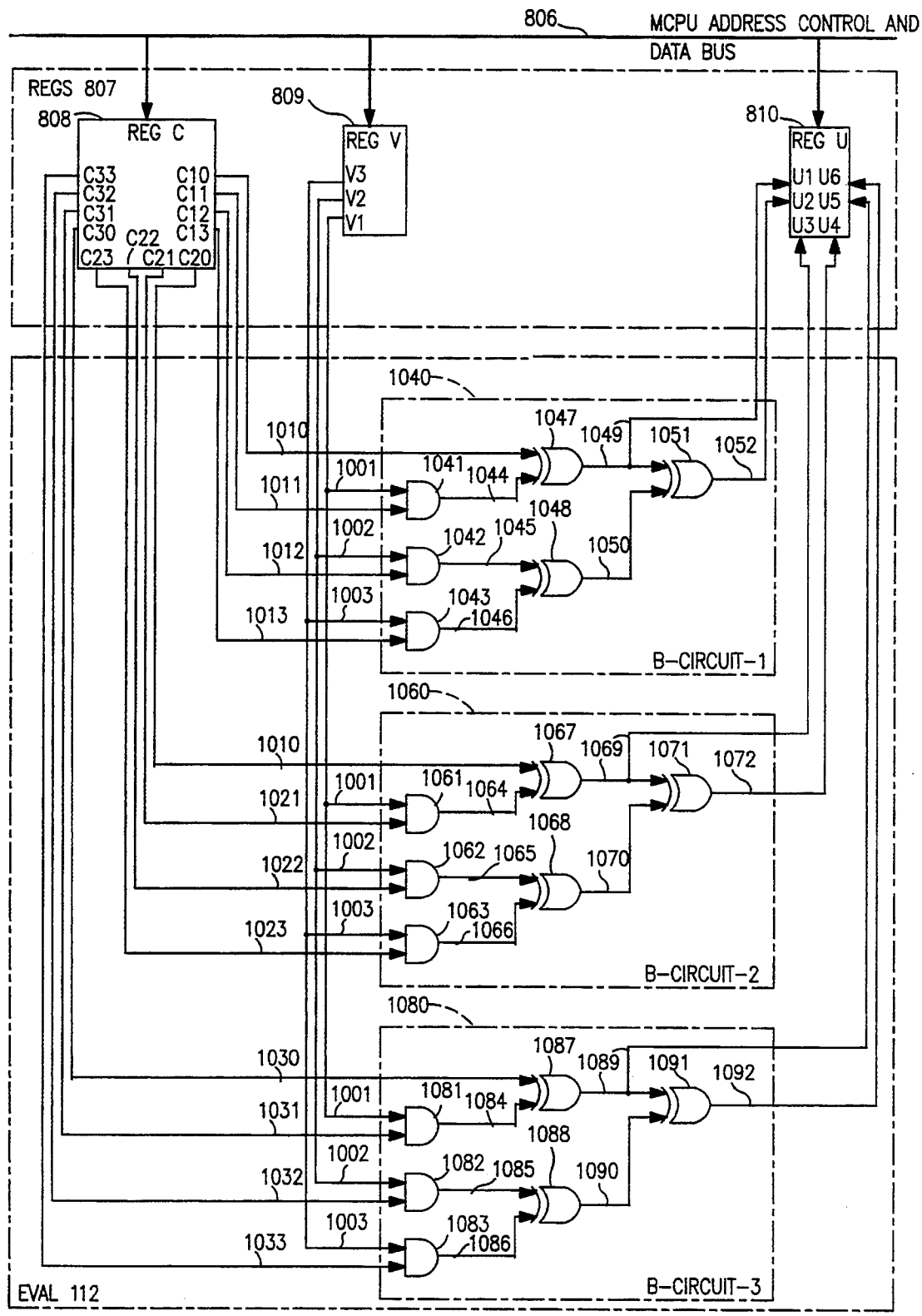
FIG. 10 depicts the details of one type of circuit for up-to-4 valued logics.

FIG. 10 illustrates the typical circuit EVAL 112 of type AX for up-to-4 valued logics. Since the truth values of a 4-valued logic have a 3-bit code, circuit EVAL 112 consists of three b-circuits, namely b-circuit-1 1040, b-circuit-2 1060 and b-circuit-3 1080. These b-circuits share the three V1,V2,V3 registers of REG V 809. Since every clause is encoded by three arrays each one consisting of four C strings (the C0,C1,C2,C3 strings), b-circuit-1 1040 is connected to the four registers of REG C 808, shown as C10,C11,C12,C13, which are set to the C strings of one array, for example that derived from the first row of the correspondence table; b-circuit-2 1060 is connected to the four C registers, shown as C20,C21,C22,C23, which are set to the C strings of another array, for example that derived from the second row of the correspondence table, while b-circuit-3 1080 is connected to the four C registers, shown as C30,C31,C32,C33, which are set to the C strings of the third array, that derived from the third row of the correspondence table. The U registers of REG U 810 are (at least) two for each b-circuit: the U1,U2 registers are connected to b-circuit-1 1040, the U3,U4 registers to b-circuit-2 1060, and the U5,U6 ones to b-circuit-3 1080.

In general, a b-circuit of EVAL 112 for up-to-n valued logics needs n−1 registers V 809, n registers C 808, and at least $\log_2 n$ to n−1 registers U 810.

Circuit EVAL 112 for the query evaluation based on the special n-valued logics assigned an n-bit code is now considered. In such cases, EVAL 112 consists of n b-circuits, that is, one more than in the (n−1)-bit code case. The additional V register relative to the V0 string is shared by all b-circuits.

The number of registers REGS 807 is independent of the b-circuit type. Therefore, that presented above also holds for circuit EVAL 112 of type AE/OE/OX.

Registers REG U 810

As previously stated, MCPU 801 determines one code bit of the truth value that the processed clause takes on by testing a proper U register 810 set by the b-circuit associated with that bit, according to the following criterion.

If the processed clause is a conjunct, then MCPU 801 assigns a 1 to the bit if the U register bits are all 1's, otherwise it assigns a 0. On the contrary, if the clause is a disjunct, then that bit is assigned a 0 if the U register bits are all 0's, otherwise it is assigned a 1.

As the clauses of the canonical form are processed by circuit EVAL 112, the bits so determined are properly catenated (in the way described in the section entitled V strings) in order to construct the V strings to be used for the final clause evaluation. When the final clause is processed, the bit code of the truth-valued result is determined by MCPU 801 according to the same criterion as above. (Notice that clauses and final clause are of opposite type, that is, if clauses are conjuncts, then the final clause is a disjunct, and conversely).

The availability of a number of U output registers for each b-circuit allows the query system to also utilize EVAL 112 for the query evaluation based on logics whose number of truth values is less than the fixed maximum. In this case, there are two main advantages. The first is that the response-time of circuit EVAL 112, viz. its b-circuits, is the same as that made for logics of that specific number of truth values. Therefore, a unique circuit fits all cases. The second advantage is the possibility of parallely processing more clauses, since the processing of a clause involves less b-circuits than the maximum. This lowers the global query process time.

When EVAL 112 is utilized for query evaluation based on logics whose number of truth values is less than the actual maximum, some C and V registers may be superfluous (i.e., unnecessary even though their content is physically involved in circuit process) or uninfluential (i.e., neither necessary nor physically involved in circuit process). In such cases, the uninfluential registers are not set by MCPU 801, while the superfluous ones are set to all 0's or to all 1's depending on whether EVAL 112 is of type AX/OX or AE/OE, respectively.

The four registers U 810 of circuit EVAL 112 relative to up-to-3 valued logics, shown in FIG. 9, are utilized as follows.

When that adopted is a three-valued logic, MCPU 801 tests the U2 and U4 registers set by b-circuit-1 930 and b-circuit-2 940 respectively.

When that concerned is the two-valued logic, only one b-circuit is involved in evaluating a clause. Moreover, the V2 and C12,C22 registers are uninfluential, so they are not set by MCPU 801. Then, the two b-circuits in FIG. 9 can process two clauses in parallel: b-circuit-1 930 processes one clause and its output analyzed by MCPU 801 is that stored in the U1 register, while b-circuit-2 940 processes the other clause and its tested output is that stored in the U3 register.

The six registers U 810 of circuit EVAL 112 relative to up-to-4 valued logics, shown in FIG. 10, are utilized as follows.

When that adopted is a four-valued logic, the output analyzed by MCPU 801 is that contained in the U2, U4, and U6 registers, set by b-circuit-1 1040, b-circuit-2 1060 and b-circuit-3 1080, respectively.

When the logic is a three-valued logic, only two b-circuits are involved in evaluating a clause. Moreover, the V3 and C13,C23,C33 registers are superfluous (this can be seen by comparing the circuit in FIG. 10 to that in FIG. 9), so they are set by MCPU 801 to all 0's since the circuit in FIG. 10 is of type AX. Two of the three b-circuits of EVAL 112 are used to process a clause. For example, b-circuit-1 1040 processes the C string array derived from the first row of the correspondence table associated with the three-valued logic concerned, whereas b-circuit-2 1060 processes the array derived from the second row. The third b-circuit, e.g. b-circuit-3 1080, processes another clause: first the C string array derived from the first row of the correspondence table and then that derived from the second row. The corresponding output of b-circuit-1 1040 is that stored in the U2 register, that of b-circuit-2 1060 is stored in the U4 register, while the output of b-circuit-3 1080 in the U6 register.

When the selected logic is the ordinary logic, only one b-circuit is involved in evaluating a clause. Moreover, the V2,V3 and C12,C13,C22,C23,C32,C33 registers are uninfluential, so they are not set by MCPU 801. Therefore, the three b-circuits can process three clauses in parallel. The corresponding output of b-circuit-1 1040 is that stored in the U1 register, that of b-circuit-2 1060 is stored in the U3 register, and the output of b-circuit-3 1080 in the U5 register.

EVAL 112

For each record, registers V 809 are set to the V strings and shared by all b-circuits. Their content is persistent during the evaluation of all clauses, except for the final clause.

For each clause, registers C 808 are set to the C string arrays which encode that clause. Each array is processed by a b-circuit.

Once the C registers connected to a b-circuit are set, MCPU 801 enables that b-circuit to operate by a CLOCK signal (not shown). The b-circuit output is stored into registers U 810. On the basis of the number of truth values of the logic, MCPU 801 examines the proper U register to determine the first, the second, ... , or the last bit of the resulting truth value code depending on whether the C string array processed by that b-circuit is derived from the first, the second, ... , or the last row of the correspondence table, according to the above described criterion.

Finally, the truth value code resulting from the final clause evaluation is transmitted to the host system for the appropriate processing.

The entire process is repeated for all records to be analyzed and is applied to the V strings as soon as they are received from the host system.

Circuit EVAL 112 for the query evaluation based on logics whose n truth values are assigned an (n−1)-bit code is first described.

Let us consider EVAL 112 of type AX. Every b-circuit operates as follows. The $V_1, V_2, \ldots, V_{n-1}$ registers are orderly anded with the corresponding C1,C2, . . . , Cn−1 registers by AND gates. Then, the C0 register and the n−1 bitstring results of logical and operations are xored (exclusive or) between themselves by XOR gates. The bitstring result is the b-circuit output and is stored in a U register. The logical xor operation among bitstrings is performed by XOR gates connected together so as to form a binary tree structure. The output of intermediate XOR gates is also stored in U registers and constitutes the output tested by MCPU 801 when EVAL 112 is utilized for query processing based on logics having a number of truth values less than the maximum allowed. (As to the b-circuits in the drawing, the intermediate output stored in the U registers has been depicted only for the upper XOR/XNOR gates.)

The AE, OE, and OX types of circuit EVAL 112 differ from the AX type only in the logical gates they utilize, as subsequently described.

EVAL 112 of Type AX

FIG. 9 illustrates circuit EVAL 112 of type AX for to up-to-3 valued logics.

The content of the V1 and V2 registers of REG V 809 is carried over the respective V leads 901 and 902 to both b-circuit-1 930 and b-circuit-2 940. The content of the C10, C11 and C12 registers of REG C 808 is carried to b-circuit-1 930 over the C leads 910, 911 and 912, while that of the C20, C21 and C22 registers to b-circuit-2 940 over the C leads 920, 921 and 922, respectively.

As to b-circuit-1 930, AND gate 931 performs the logical and between signals 901 and 911, and its output signal 932 is applied to the lower input of XOR gate 933. The upper input of XOR gate 933 is signal 910. Output signal 934 of XOR gate 933 is stored in the U1 register of REG U 810 and is also extended to the upper input of XOR gate 937.

The U1 register is the output of b-circuit-1 930 examined by MCPU 801 when EVAL 112 is utilized for query evaluation based on the ordinary two-valued logic. In this case, the V2 and C12 registers are uninfluential. If the ordinary logic has been selected, then application COMPQ 110 does not generate the final clause. In fact, it is well known that the disjunctive (respectively, conjunctive) canonical form of a logical expression takes on the truth value T (resp., F) only if at least one conjunct (resp., disjunct) does so. For this reason, MCPU 801 is programmed to terminate the processing of clauses if and soon as it detects in the U1 register or in the analogous U3 register set by b-circuit-2 940 a pattern of all 1's when the processed clause is a conjunct, or a pattern of all 0's when the processed clause is a disjunct. In the former case, MCPU 801 transmits a 1 (for T) as result to the host system, while it transmits a 0 (for F) in the latter case. Afterwards, the circuit apparatus is ready to start the clause evaluation process on the V strings relative to subsequent record. On the contrary, if the above pattern is detected for no clause, then MCPU 801 transmits a 0 (for F) or a 1 (for T) to the host system according to whether the canonical form is disjunctive or conjunctive.

When a three-valued logic is selected, the V2 and C12 registers are necessary and their content is applied to the input of AND gate 935 through leads 902 and 912, respectively. Output signal 936 of AND gate 935 is applied to the lower input of XOR gate 937. Output signal 938 of XOR gate 937 is stored in the U2 register of REG U 810 to be analyzed by MCPU 801 as has been already described.

The operation of b-circuit-2 940 is similar to that of b-circuit-1 930. AND gate 941 performs the logical and between signals 901 and 921, and its output signal 942 is applied to the lower input of XOR gate 943. The upper input of XOR gate 943 is signal 920. Output signal 944 of XOR gate 943 is stored in the U3 register of REG U 810 and is also extended to the upper input of XOR gate 947. The U3 register is the output of b-circuit-2 940 tested by MCPU 801 when EVAL 112 is utilized for query evaluation based on the ordinary logic. In parallel, AND gate 945 performs the logical and between signals 902 and 922, and its output signal 946 is applied to the lower input of XOR gate 947. Output signal 948 of XOR gate 947 is stored in the U4 register of REG U 810 to be subsequently analyzed by MCPU 801.

FIG. 10 illustrates circuit EVAL 112 of type AX for up-to-4 valued logics. According to the previously described operation and architecture of the b-circuit, the circuit in FIG. 10 is the appropriate extension of that in FIG. 9.

The content of the V1,V2,V3 registers of REG V 809 is carried over the respective V leads 1001,1002,1003 to b-circuit-1 1040, b-circuit-2 1060 and b-circuit-3 1080. The content of the C10,C11,C12,C13 registers of REG C 808 is carried to b-circuit-1 1040 over the C leads 1010,1011,1012,1013; the content of the C20,C21,C22,C23 registers is carried to b-circuit-2 1060 over the C leads 1020,1021,1022,1023; the content of the C30,C31,C32,C33 registers is carried to b-circuit-3 1080 over the C leads 1030,1031,1032 and 1033, respectively.

Let us consider b-circuit-1 1040. AND gate 1041 performs the logical and between signals 1001 and 1011. In parallel, AND gate 1042 performs the logical and between signals 1002 and 1012, while AND gate 1043 performs the logical and between signals 1003 and 1013. Then signal 1010 and the respective output signals 1044, 1045, 1046 of AND gates 1041, 1042, 1043 are xored between themselves by means of a tree-structured XOR gate network. In particular, XOR gate 1047 performs the logical xor between signals 1010 and 1044 while XOR gate 1048 performs xor between signals 1045 and 1046. Output signal 1049 of XOR gate 1047 is stored in the U1 register of REG U 810 and is also extended to the upper input of XOR gate 1051. The lower input of XOR gate 1051 consists of signal 1050 which is the output of XOR gate 1048. XOR gate 1051 performs the logical xor between signals 1049 and 1050, and its output signal 1052 is stored in the U2 register.

The operation of b-circuit-2 1060 (resp., b-circuit-3 1080) is quite similar. AND gates 1061, 1062, 1063 (resp., AND gates 1081, 1082, 1083) perform the logical and between signals 1001, 1002, 1003 and the corresponding signals 1021, 1022, 1023 (resp., 1031, 1032, 1033), producing output signals 1064, 1065, 1066 (resp., 1084, 1085, 1086). Then, XOR gate 1067 (resp., XOR gate 1087) performs the logical xor between signals 1020 and 1064 (resp., 1030 and 1084). Its output signal 1069 (resp., 1089) is stored in the U3 (resp., U5) register of REG U 810 and is also extended to the upper input of XOR gate 1071 (resp., XOR gate 1091). In parallel, XOR gate 1068 (resp., XOR gate 1088) performs the logical xor between signals 1065 and 1066 (resp., 1085 and 1086) and its output signal 1070 (resp., 1090) is the lower input of XOR gate 1071 (resp., XOR gate 1091). Output signal 1072 (resp., 1092) of XOR gate 1071 (resp., XOR gate 1091) is stored in the U4 (resp., U6) register of REG U 810.

When the ordinary logic is adopted, the V2,V3 and C12,C13,C22,C23,C32,C33 registers are uninfluential. Those registers of REG U 810 then tested by MCPU 801 are U1,U3, and U5. The processing of clauses is performed in accordance with that described for circuit EVAL 112 of FIG. 9.

When a 3- or 4-valued logic is used, those registers of REG U 810 tested by MCPU 801 are U2,U4, and U6.

In particular, when a three-valued logic is selected, the output produced by the circuit in FIG. 10 is the same as that produced by the circuit in FIG. 9. In fact, both signals 1003 and 1013 are sequences of 0's since, as we said, the superfluous V3 and C13 registers are set to all 0's by MCPU 801. Thus, also output signal 1046 of AND gate 1043 is a sequence of 0's. This allows signal 1045 to be extended through XOR gate 1048 and over lead 1050 to the lower input of XOR gate 1051. In this manner, b-circuit-1 1040 effects the same function as that accomplished by a b-circuit particularly made for three-valued logics (such as b-circuit-1 930). Similar considerations hold for the superfluous V3,C23 and V3,C33 registers applied to the input of b-circuit-2 1060 and b-circuit-3 1080.

Figure 11:
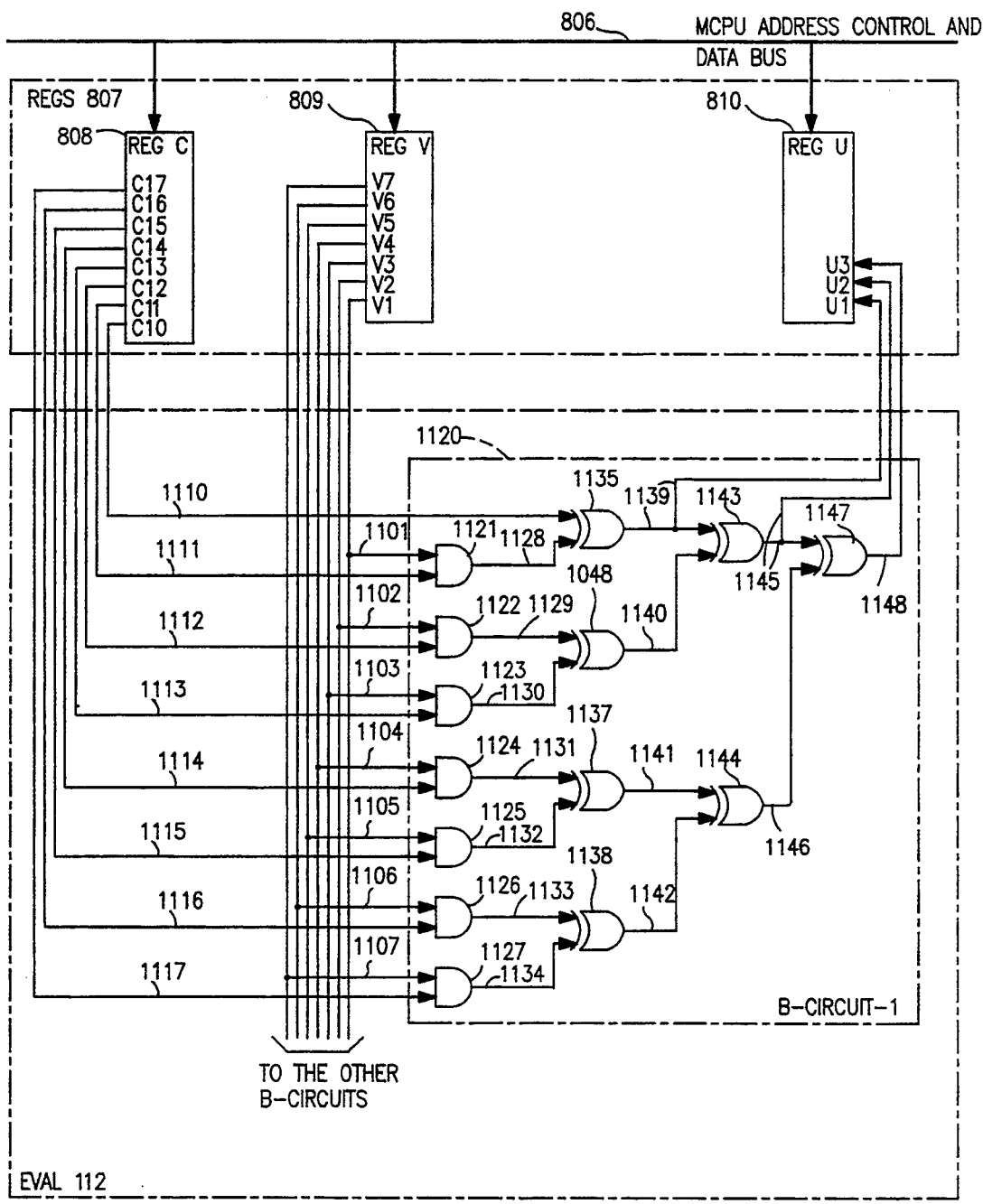
FIG. 11 through 14 depict the details of the four fundamental types of the circuit for up-to-8 valued logics.

Circuit EVAL 112 for the query evaluation based on logics constituted of more than four truth values is the appropriate extension of the circuit of FIG. 10 according to the architecture design previously described. As an example, FIG. 11 illustrates one b-circuit of EVAL 112 of type AX relative to up-to-8 valued logics, namely b-circuit-1 1120. The b-circuit-2 to b-circuit-7 are the equivalents of b-circuit-1 1120. The registers of REGS 807 shown in FIG. 11 refer only to those connected to b-circuit-1 1120, except for the V1,V2,V3,V4,V5,V6,V7 registers of REG V 809 which are connected to the input of all b-circuits through respective leads 1101, 1102, 1103, 1104, 1105, 1106, 1107. For each given clause, the C10,C11,C12,C13,C14,C15,C16,C17 registers of REG C 808 contain the C strings of one of the arrays which encode that clause and they are connected to the input of b-circuit-1 1120 through respective leads 1110, 1111, 1112, 1113, 1114, 1115, 1116, 1117. The other C registers, C20,C21, . . . , C27 to C70,C71, . . . , C77 (not shown), contain the C strings of the other arrays encoding that clause and they are connected to the input of b-circuit-2 to b-circuit-7, respectively. Finally, the U registers of REG U 810 are (at least) three for each b-circuit. FIG. 11 shows only the three U1,U2,U3 registers connected to b-circuit-1 1120.

AND gates 1121, 1122, 1123, 1124, 1125, 1126, 1127 respectively perform the logical and between signals 1101, 1102, 1103, 1104, 1105, 1106, 1107 and the corresponding signals 1111, 1112, 1113, 1114, 1115, 1116, 1117. Then signal 1110 and respective output signals 1128, 1129, 1130, 1131, 1132, 1133, 1134 of AND gates 1121, 1122, 1123, 1124, 1125, 1126, 1127 are xored between themselves by means of a tree-structured XOR gate network. In particular, XOR gate 1135 performs the logical xor between signals 1110 and 1128 producing signal 1139. In parallel, XOR gate 1136 performs xor between signals 1129 and 1130 producing signal 1140, XOR gate 1137 performs xor between signals 1131 and 1132 producing signal 1141, and XOR gate 1138 performs xor between signals 1133 and 1134 producing signal 1142. Then XOR gate 1143 performs xor between signals 1139 and 1140 producing signal 1145 while XOR gate 1144 performs xor between signals 1141 and 1142 producing signal 1146. Finally, XOR gate 1147 performs xor between signals 1145 and 1146 producing signal 1148 which is stored in the U3 register of REG U 810. Signals 1139 and 1145, which are the output of intermediate XOR gate 1135 and XOR gate 1143, are also extended and stored in the U1 and U2 registers, respectively.

When the ordinary logic is used, the output of b-circuit-1 1120 tested by MCPU 801 is the U1 register. The V2, . . . , V7 and C12, . . . , C17 registers are uninfluential.

When the logic is 3- or 4-valued, the output register tested by MCPU 801 is the U2 register. The V4, . . . , V7 and C14, . . . , C17 registers are uninfluential. Moreover, when a 3-valued logic is used, the V3 and C13 registers are superfluous and they are set to all 0's since b-circuit-1 1120 is of the AX type.

When the logic used is 5-, 6-, 7-, or 8-valued, the output of b-circuit-1 1120 tested by MCPU 801 is the U3 register. If the number of truth values is less than 8, for example 6, then the superfluous V6,V7 and C16,C17 registers are set to all 0's.

EVAL 112 of Types AE, OE, and OX

Circuit EVAL 112 of type AE differs from type AX in that it utilizes XNOR (EQUIVALENCE, EXCLUSIVE-NOR) gates instead of XOR gates.

Circuit EVAL 112 of type OE differs from type AX in that it utilizes OR gates instead of AND gates, and XNOR gates instead of XOR gates.

Circuit EVAL 112 of type OX differs from type AX in that it utilizes OR gates instead of AND gates.

In all cases, the output stored in registers U 810 is independent of the EVAL 112 circuit type. Thus, registers U are tested by MCPU 801 according to the criterion already discussed.

As to input, on the contrary, the correspondence tables, hence the C strings produced by application COMPQ 110 which are then applied to registers C 808, are generally dependent on the EVAL 112 circuit type, as shown in FIGS. 4 through 7.

Figure 12:
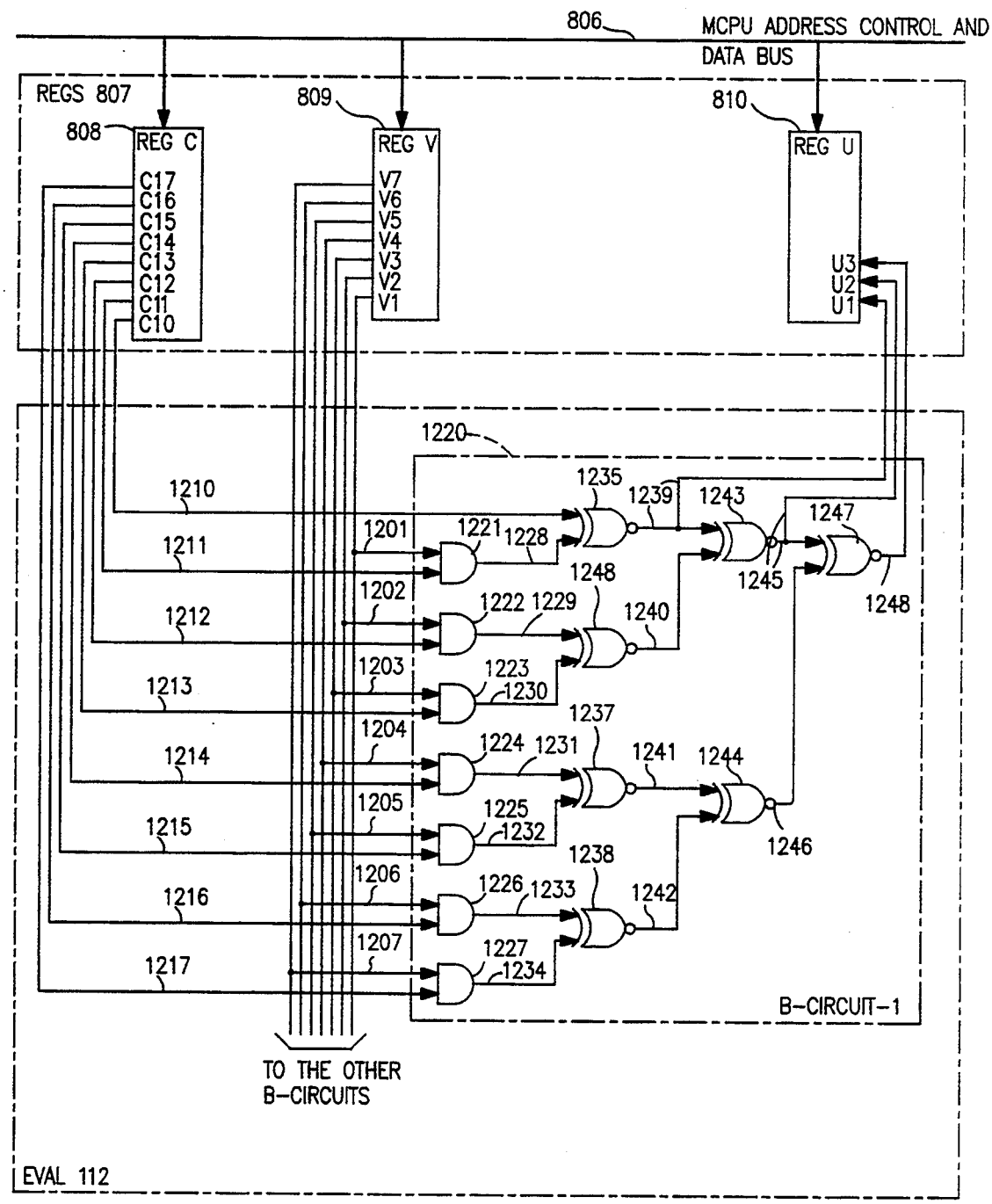
Figure 13:
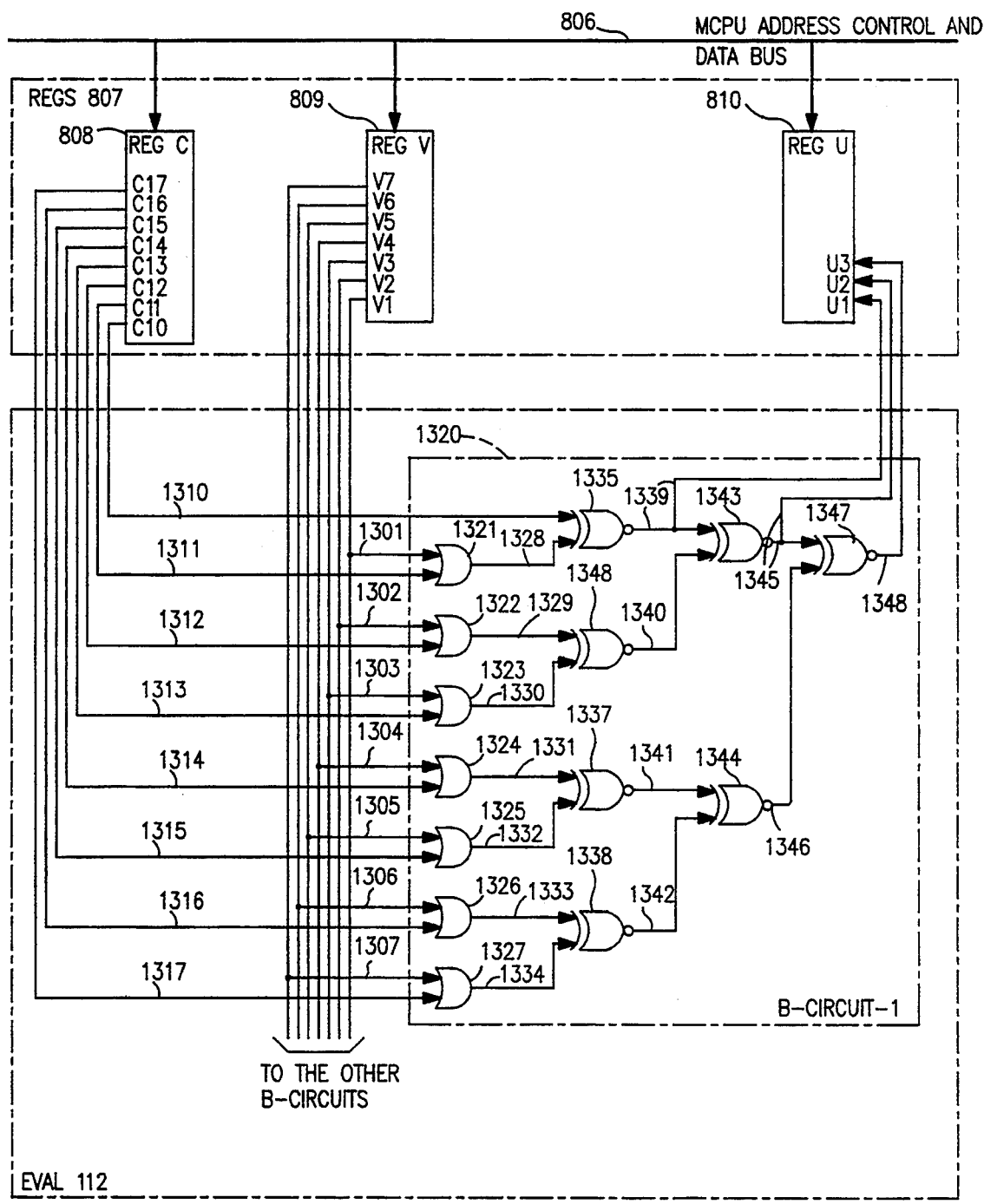
Figure 14:
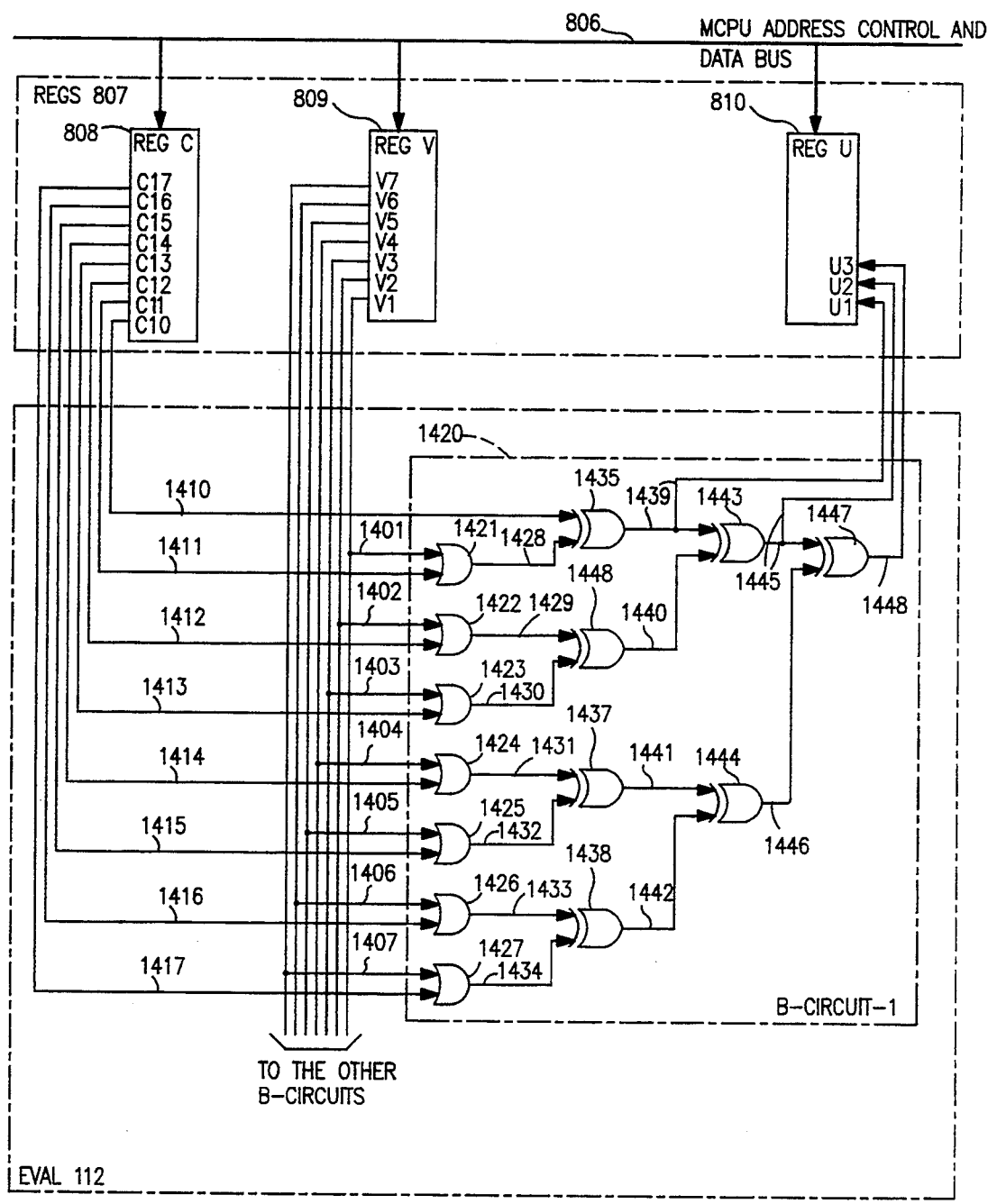
Figure 15:
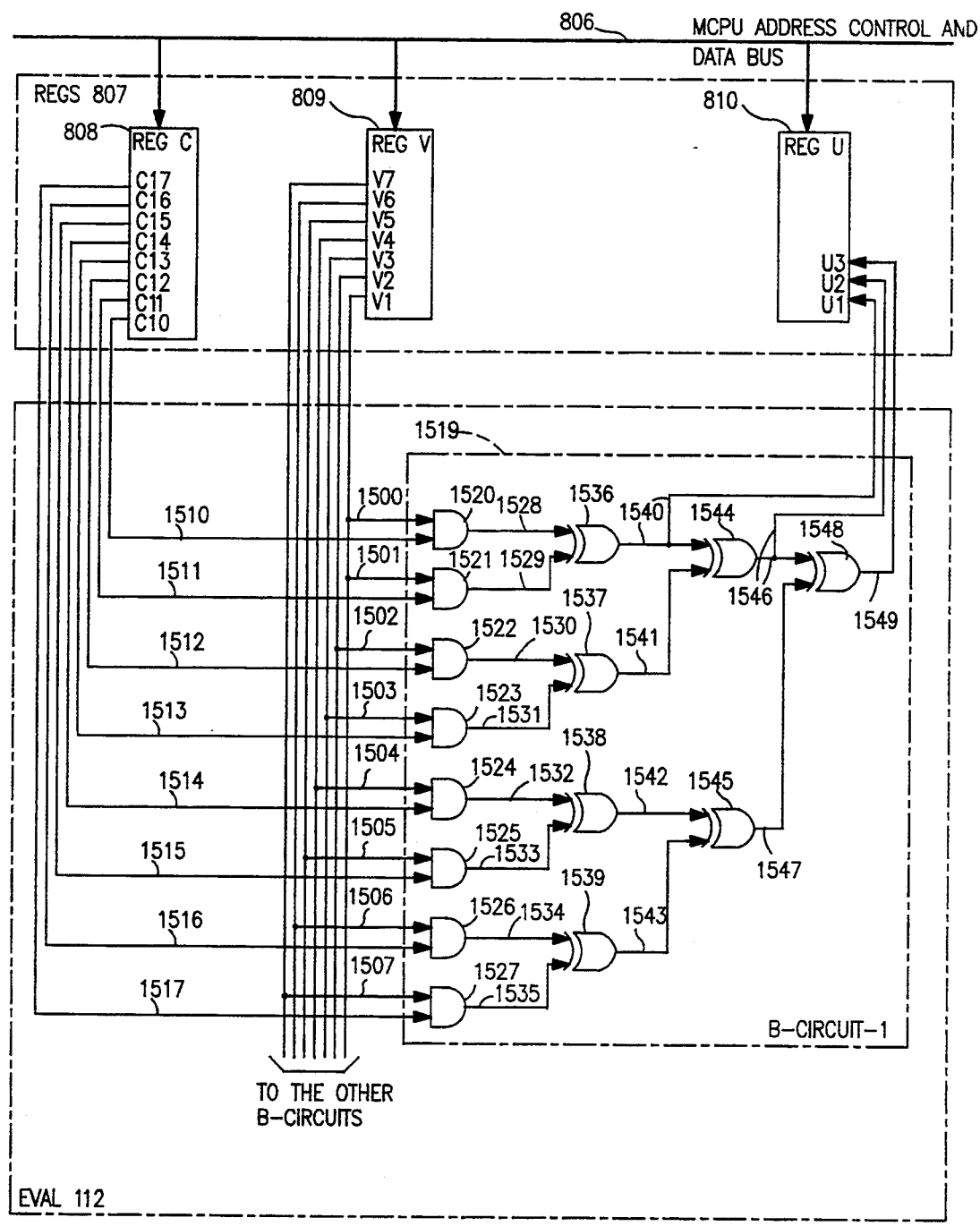
FIGS. 15 through 18 depict the details of the four fundamental types of the generalized circuit for up-to-8 valued logics.
Figure 16:
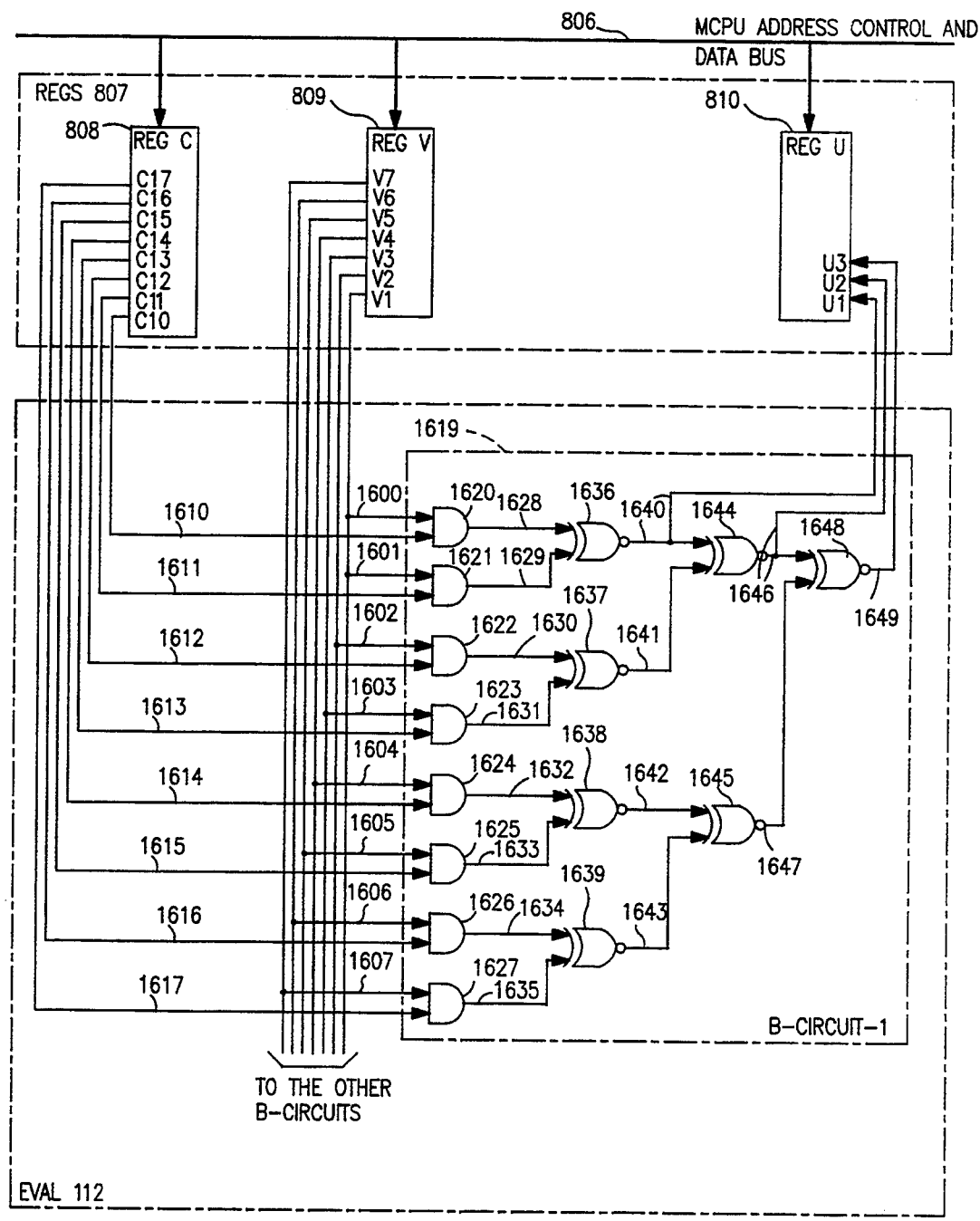
Figure 17:
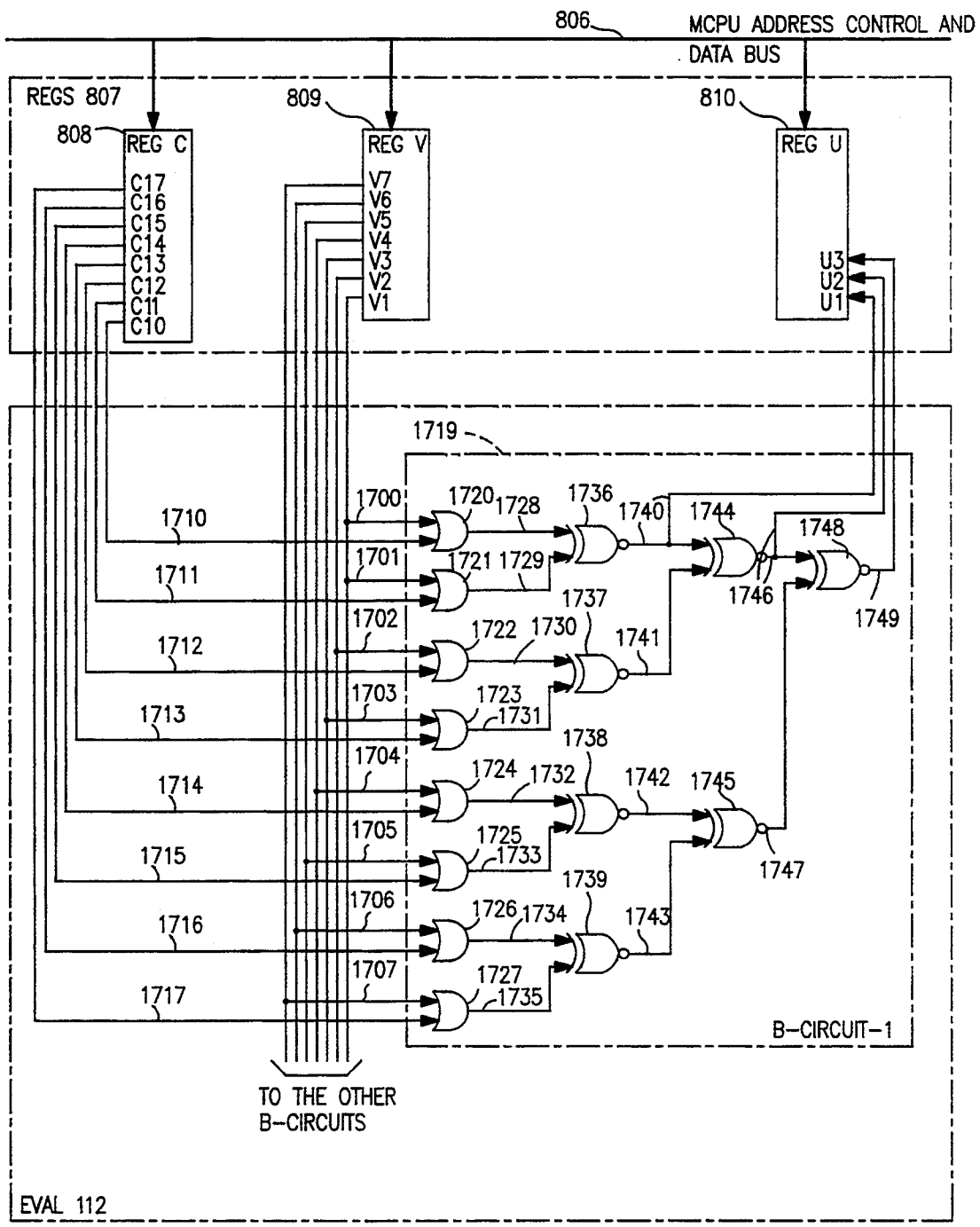
Figure 18:
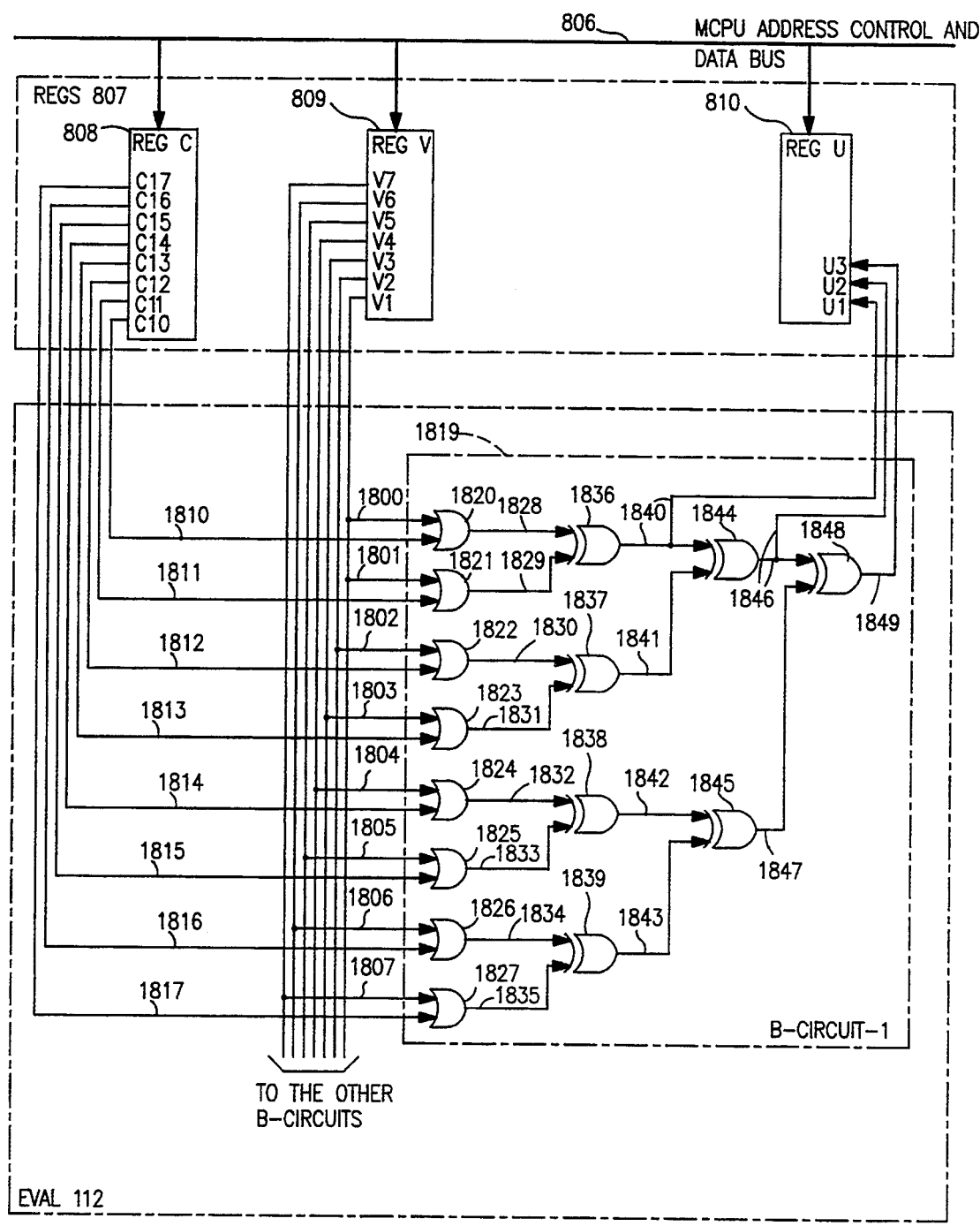

On the basis of that previously stated, it is simple to derive the equivalent of type AE/OE/OX from circuit EVAL 112 of type AX already described. To provide an illustrative example, FIGS. 12, 13, and 14 respectively show the typical EVAL 112 b-circuit of type AE, OE, and 0X for the query evaluation based on up-to-8 valued logics. For each of these b-circuits, what has been said about b-circuit-1 1120 of type AX holds true. As an example, b-circuit-1 1320 of type OE depicted in FIG. 13 will be described in detail.

OR gates 1321, 1322, 1323, 1324, 1325, 1326, 1327 respectively perform the logical or between signals 1301, 1302, 1303, 1304, 1305, 1306, 1307, which correspond in that order to the V1,V2, . . . , V7 registers, and the corresponding signals 1311, 1312, 1313, 1314, 1315, 1316, 1317, which correspond in that order to the C11,C12, . . . , C17 registers. Then signal 1310 (corresponding to the C10 register) and respective output signals 1328, 1329, 1330, 1331, 1332, 1333, 1334 of OR gates 1321, 1322, 1323, 1324, 1325, 1326, 1327 are xnored (exclusive-nor) between themselves by means of a tree-structured XNOR gate network. In particular, XNOR gate 1335 performs the logical xnor between signals 1310 and 1328 producing signal 1339. In parallel, XNOR gate 1336 performs xnor between signals 1329 and 1330 producing signal 1340, XNOR gate 1337 performs xnor between signals 1331 and 1332 producing signal 1341, and XNOR gate 1338 performs xnor between signals 1333 and 1334 producing signal 1342. Then XNOR gate 1343 performs xnor between signals 1339 and 1340 producing signal 1345 while XNOR gate 1344 performs xnor between signals 1341 and 1342 producing signal 1346. Finally, XNOR gate 1347 performs xnor between signals 1345 and 1346 producing signal 1348 which is stored in the U3 register of REG U 810. Signals 1339 and 1345, which are the output of intermediate XNOR gate 1335 and XNOR gate 1343, are also extended and stored in the U1 and U2 registers, respectively.

When a 3-, 5-, 6-, or 7-valued logic is concerned, the appropriate C and V registers which are superfluous are set by MCPU 801 to all 1's since b-circuit-1 1320 is of the OE type.

Generalized EVAL 112

We now consider the circuit EVAL 112 for the query evaluation based on special logics where, in order to assure the same flexibility of use previously discussed, the subject query system assigns truth value code of as many bits as truth values.

In this case, as already mentioned, the number of b-circuits that constitute EVAL 112 is one more than in the case considered previously, and an additional register (V0 register) in REG V 809 is required to support the V0 string.

This kind of EVAL 112 circuit is termed "generalized" for it can also be utilized for the query evaluation based on the logics previously discussed (those whose n truth values are assigned an (n−1)-bit code), as will be illustrated subsequently.

Generalized EVAL 112 of type AX is first considered. Every b-circuit operates as follows. The V0,V1, . . ., Vn−1 registers are orderly anded with the corresponding C0,C1, . . . , Cn−1 registers by AND gates. Then, the n bitstring results of logical and operations are xored between themselves by XOR gates connected so as to form a binary tree structure. The bitstring result is the b-circuit output and is stored in a U register. The output of intermediate XOR gates is also stored in U registers and constitutes the output tested by MCPU 801 when generalized EVAL 112 is utilized for query processing based on logics having a number of truth values less than the maximum allowed. (As to the b-circuits in the drawing, the intermediate output stored in the U registers has been depicted only for the upper XOR/XNOR gates). The U registers are tested by MCPU 801 according to the criterion already described.

Generalized EVAL 112 of type AE differs from type AX in that it utilizes XNOR gates instead of XOR gates.

Generalized EVAL 112 of type OE differs from type AX in that it utilizes OR gates instead of AND gates, and XNOR gates instead of XOR gates.

Generalized EVAL 112 of type OX differs from type AX in that it utilizes OR gates instead of AND gates.

FIGS. 15, 16, 17, and 18 respectively show the typical b-circuit of generalized EVAL 112 of type AX, AE, OE, and OX for the query evaluation based on up-to-8 valued special logics. It suffices to illustrate only one, for example, generalized b-circuit-1 1519 of type AX depicted in FIG. 15, since this description also holds, mutatis mutandis, for b-circuit-1 1619 of FIG. 16, b-circuit-1 1719 of FIG. 17 and b-circuit-1 1819 of FIG. 18.

AND gates 1520, 1521, 1522, 1523, 1524, 1525, 1526, 1527 respectively perform the logical and between signals 1500, 1501, 1502, 1503, 1504, 1505, 1506, 1507, which correspond in that order to the V0,V1, . . . , V7 registers, and the corresponding signals 1510, 1511, 1512, 1513, 1514, 1515, 1516, 1517, which correspond in that order to the C10,C11, . . . , C17 registers. Then respective output signals 1528, 1529, 1530, 1531, 1532, 1533, 1534, 1535 of AND gates 1520, 1521, 1522, 1523, 1524, 1525, 1526, 1527 are xored between themselves by means of a tree-structured XOR gate network. In particular, XOR gate 1536 performs the logical xor between signals 1528 and 1529 producing signal 1540. In parallel, XOR gate 1537 performs xor between signals 1530 and 1531 producing signal 1541, XOR gate 1538 performs xor between signals 1532 and 1533 producing signal 1542, and XOR gate 1539 performs xor between signals 1534 and 1535 producing signal 1543. Then XOR gate 1544 performs xor between signals 1540 and 1541 producing signal 1546 while XOR gate 1545 performs xor between signals 1542 and 1543 producing signal 1547. Finally, XOR gate 1548 performs xor between signals 1546 and 1547 producing signal 1549 which is stored in the U3 register of REG U 810. Signals 1540 and 1546, which are the output of intermediate XOR gate 1536 and XOR gate 1544, are also extended and stored in the U1 and U2 registers, respectively.

MCPU 801 tests the U1 register when a (special) two-valued logic is concerned; the U2 register is tested when a (special) 3- or 4-valued logic is concerned; while the U3 register is tested when the (special) logic concerned is a 5-, 6-, 7-, or 8-valued one.

Versatility of Generalized EVAL 112

In order to utilize generalized EVAL 112 for the query evaluation based on common logics, MCPU 801 is programmed to set the V0 register to all 1's (resp., to all 0's) when the b-circuit is of type AX/AE (resp., OX/OE). In fact, considering b-circuit-1 1519 as an example, when signal 1500 is a sequence of all 1's, signal 1510 (corresponding to the C0 register) is extended through AND gate 1520 and over lead 1528 to the upper input of XOR gate 1536. Consequently, the generalized b-circuit-1 1519 produces the same output as that produced by the corresponding b-circuit-1 1120.

The output signal of each XOR/XNOR gate of a b-circuit, for example signals 1541, 1542, 1543, 1547 of generalized b-circuit-1 1519 and signals 1140, 1141, 1142, 1146 of b-circuit-1 1120, can be extended on supplementary leads (not shown) to be stored into supplementary registers U 810 (not shown). In this manner, when the number of truth values of the selected logic is appropriately less than the actual maximum supported, each b-circuit can be utilized to process more C string arrays or even clauses in parallel. The reason is that the b-circuit itself is structurally composed of internal b-circuits. Every supplementary register U, if used, is tested by MCPU 801 according to the criterion already described.

Flexibility of the Query System

The flexibility of the subject data query system is illustrated by referring to the sample census database shown in table 1901 of FIG. 19. Table 1901 contains information about individuals: name, sex, civil status, year of marriage, and other (not shown) data. The mark "?" stands for null value: Jones is unmarried and so the value of his year of marriage is null; Blake is married but her year of marriage is unknown (that is, unrecorded) hence null; it is unknown whether Clark is or is not married, hence her civil status value and possible year of marriage are null. Let the example query against the database in table 1901 be relative to the printing of information concerning the individuals married after 1940. (Here, there are expressed two atomic conditions: (1) civil status=married, and (2) year of marriage >1940.)

We shall assume that the query system provides query evaluation based on 2 to at least 5-valued logics. Circuit EVAL 112 is, for example, composed of b-circuits of one type shown in FIGS. 11 through 18.

FIG. 20 shows the printout depending on the logic utilized by the query system, possibly specified by the user.

Printout 2010 refers to the query evaluation based on the ordinary logic. In this case, the host system does not process the records that contain null values in data fields qualified by the query (namely, civil status and year of marriage). The one table produced, namely table 2011, is the usual so-called true result.

Printout 2020 results from the query evaluation based on the standard three-valued logic {T,U,F}. In this case, the host system assigns the result of atomic condition evaluation on data marked "?" the truth value U. Now two tables are produced by the query system as result of the query process: table 2021, which is the same as table 2011, is the true result (that is, all and only records which the query selection condition processed by EVAL 112 takes the truth value T on), and table 2022 is the usual so-called maybe result (that is, all and only records which the selection condition takes the truth value U on).

Careful examination of the significance of the information conveyed by the data of table 1901 reveals that nulls relative to year of marriage can have different meanings which is not so for nulls relative to civil status. In fact, the value relative to the year of Jones' marriage is inapplicabile (because he is unmarried), hence the properly corresponding truth value is I, while the one referring to Blake's marriage is applicable (because she is married) but unknown, hence the properly corresponding truth value is A. On the other hand, the civil status value is always applicable to every individual, hence only the truth value A can correspond to a possible null in this field. Since we have assumed that the query system provides the query evaluation based on up-to-5 valued logics, it is likewise possible to process the query on the basis of a four-valued logic {T,A,I,F} selected by the user or by system default, for example the standard one referred to in FIG. 6 or Codd's logic referred to in FIG. 7. In both cases, however, the query system again produces printout 2020. The only difference from the previous analysis based on the standard ternary logic is that here table 2022 (the maybe result) refers to records which the selection condition takes the truth value A on.

Therefore, the adoption of a four-valued logic, though more significant than a three-valued one, does not produce a substantial increase of the user's knowledge of individuals which match the query. In particular, there is no evidence that Clark (because possibly unmarried) has a lower average probability to match the query than Blake (because surely married). The problem with such four-valued logic is that the host system can only assign the truth value A as result of evaluating atomic condition (2) for Clark.

The above problem can be overcome by utilizing the subject query system on the basis of a five-valued logic, say, {T,AI,A,I,F} where AI is the special value which means "A or I". This allows the host system to assign a reasonable truth value, namely AI, when evaluating atomic condition (2) for Clark. With this arrangement, the query result is printout 2030, where table 2031 is the true result; table 2032 is the maybe result (the records which the selection condition takes the truth value A on); while table 2033 is, say, the doubtful result (that is, the records which the selection condition takes the truth value AI on). In this fashion, printout 2030 when compared to printout 2020 is easier for the user to understand and corresponds better to reality with respect to the query.

It must be stressed that the versatility and flexibility of the subject query system is in the fact that it can be utilized in a standard way whatever logic is being considered from those available, that is, from those whose correspondence table is available to application COMPQ 110. Moreover, the set of useable logics can be increased with time without modifying circuit EVAL 112; one needs only to add the proper correspondence table(s) and the truth value codes for the new logic(s). Therefore, circuit EVAL 112 should be realized so as to support a number of truth values adequate to future needs.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

Bibliographic References Cited

[1] American National Standard Institute, entitled "ANSI/X3/SPARC Study Group on Database Management Systems Interim Report", published in FDT Bull, ACM SIGMOD Rec., vol.7, no.2, 1975.

[2] E. F. Codd, entitled "Extending the Database Relational Model to Capture More Meaning", published in ACM Trans. on Data Base Systems, vol.4, no.4, (December 1979), pp. 397–434.

[3] E. F. Codd, entitled "The Relational Model for Database Management, version 2", published by Addison-Wesley, Reading, Mass., 1990.

[4] G. H. Gessert, entitled "Four Valued Logic for Relational Database Systems", published in ACM SIGMOD Rec., vol.19, no.1, 1990, pp. 29–35.

[5] E. Lefons, entitled "Modello di Oggetti Funzionali per Basi di Dati Analitiche", published in Rivista di Informatica, vol. XVIII, no.3, 1988, pp. 305–339.

I claim:

1. A digital information processing system for solving many-valued logic equations comprising:

circuitry means for supplying a first plurality of input strings V and a second plurality of groups of input strings C;

a many-valued logic processor for processing said sequences of many-valued input signals encoded by V strings on the basis of sequences of many-valued input operations encoded by said groups of C strings, and producing sequences of output signals representing U strings, a selected group of said U strings producing a group of binary signals which is the plural-bit code of a many-valued truth value, by carrying out selected many-valued logical operations on said input many-valued truth values (or V strings);

parallel registers having plural-bit storage locations for storing sequences of input signals representing said second plurality of C strings, sequences of input signals representing said first plurality of V strings, and sequences of output signals representing said output U strings;

circuitry connecting said many-valued logic processor with said parallel registers plural-bit storage locations for storing sequences of output strings U produced by the many-valued logic processor; and, output processing means for processing a group of selected U strings stored in said parallel registers plural-bit storage locations and producing, for each selected string U, a predetermined binary signal when the bits of said selected string U are all set to a predetermined value.

2. A digital information system as defined in clam 1, wherein:

the many-valued processor executes n arbitrary many-valued logic operations, where each of the n truth values of a logic operation is represented by binary code using n−1 bits; and each sequence of many-valued input values is represented by n−1 strings V;

each sequence of many-valued input operations on said sequence of many-valued input values is represented by n strings C; and, the many-valued logic processor provides processing of N-valued logics whose N truth values are represented by binary code using N-1 bits and is realized in accordance with the circuit EVAL consisting of a plurality of b-circuits of either type AX, type AE, type OE or type OX and each b-circuit produces a plurality of sequences of output signals or U strings to be selectively processed by said output processing means.

3. A digital information system having a many-valued logic processor as defined in claim 1, wherein:

the many-valued processor provides the processing of n arbitrary many-valued logic operations where each of n truth values of said logic operation is represented by a binary code using up to n bits;

each sequence of many-valued input values is represented using up to n strings V;

each sequence of many-valued input operations on said sequence of input many-valued values is represented by n strings C; and, the many-valued logic processor for processing N-valued logic functions, whose truth values are represented by a binary code using up to N bits, is realized in accordance with the generalized circuit EVAL consisting of a plurality of generalized b-circuits of either type AX, type AE, type OE or type OX and each generalized b-circuit produces a plurality of sequences of output signals or U strings to be selectively processed by said output processing means.

* * * * *